United States Patent [19]
Tsukamoto et al.

[11] Patent Number: 5,779,585
[45] Date of Patent: Jul. 14, 1998

[54] HYDRAULIC CONTROL APPARATUS FOR AUTOMATIC TRANSMISSION

[75] Inventors: Kazumasa Tsukamoto, Toyota; Masahiro Hayabuchi; Masaaki Nishida, both of Anjo; Yoshihisa Yamamoto; Akitomo Suzuki, both of Nishio, all of Japan

[73] Assignee: Aisin Aw Co., Ltd., Japan

[21] Appl. No.: 763,946

[22] Filed: Dec. 12, 1996

[30] Foreign Application Priority Data

Dec. 12, 1995 [JP] Japan ................. 7-323273

[51] Int. Cl.$^6$ ............................................. F16H 5/66
[52] U.S. Cl. ................................................. 475/128
[58] Field of Search .............................. 475/127, 128

[56] References Cited

U.S. PATENT DOCUMENTS 5,342,253  8/1994  Mizobe et al. ............... 475/128
5,605,516  2/1997  Tsukamoto et al. ........... 475/128
5,634,864  6/1997  Niyama et al. ............... 475/128

Primary Examiner—Dirk Wright
Attorney, Agent, or Firm—Lorusso & Loud

[57] ABSTRACT

To achieve a predetermined speed by engaging or releasing friction engagement elements of an auxiliary shift mechanism, a fluid pressure changeover valve is switched to a position for communication between a regulated pressure input port and an output port, so that regulated fluid pressure from a pressure regulating valve is supplied through second shift mechanism-side shift valves to the friction engagement elements of the auxiliary shift mechanism to be engaged or released. This position switch of the changeover valve also connects a line pressure input port to an output port whereby line pressure is supplied to the main shift mechanism-side shift valves to maintain the main shift mechanism in a predetermined speed state. To achieve a predetermined speed by a shift in the main shift mechanism, the regulated pressure input port is connected to the output port providing communication with the main shift mechanism shift valves, and the line pressure input port becomes connected to the output port providing communication with the auxiliary shift mechanism shift valves.

18 Claims, 20 Drawing Sheets

FIG. 4

| POSITION | | SOLENOID | | | | | CLUTCH | | | BRAKE | | | | |
|---|---|---|---|---|---|---|---|---|---|---|---|---|---|---|
| | | No. 1 | No. 2 | No. 3 | No. 4 | No. 5 | C1 | C2 | C3 | B1 | B2 | B3 | B4 | B5 |
| P | | × | × | × | × | × | × | × | × | × | × | × | × | × |
| R | V≤7 | ○ | × | × | ○ | ○ | × | ○ | × | × | × | ○ | × | ○ |
| R | V>7 | × | × | × | ○ | × | × | × | × | × | × | ○ | × | ○ |
| N | | × | × | × | × | × | × | × | × | × | × | × | × | ○ |
| D | 1ST | ○ | ○ | ○ | × | × | ○ | × | × | ○ | ○ | × | × | ○ |
| | 2ND | × | × | ○ | × | × | ○ | × | × | ○ | ○ | × | × | × |
| | 3RD | × | × | × | ○ | × | ○ | × | × | × | ○ | △ | × | × |
| | 4TH | × | × | × | × | × | ○ | ○ | × | × | ○ | × | ○ | × |
| | 5TH | × | ○ | ○ | × | × | ○ | ○ | × | × | × | × | × | ○ |
| | 2.5 | × | ○ | ○ | × | × | ○ | × | × | ○ | ○ | × | × | × |
| | 3.5 | × | × | ○ | ○ | × | ○ | × | × | × | ○ | △ | ○ | × |
| 4 | 1ST | ○ | × | ○ | × | × | ○ | × | × | ○ | ○ | × | × | ○ |
| | 2ND | × | × | ○ | ○ | × | ○ | × | × | ○ | ○ | × | × | × |
| | 3RD | × | × | × | ○ | × | ○ | × | ○ | × | ○ | × | × | × |
| | 4TH | × | × | × | × | × | ○ | ○ | ○ | × | ○ | × | × | × |
| 3 | 5TH | × | ○ | × | × | ○ | ○ | × | × | × | × | × | × | ○ |
| 2 | Shift 1→2 | | | | | | | | | | | | | |
| | 2→3 Shift | | | | | | | | | | | | | |
| | 3→4 Shift | | | | | | | | | | | | | |
| | 4→5 Shift | | | | | | | | | | | | | |
| | 4→2 Shift | | | | | | | | | | | | | |
| | 5→2.5 Shift | | | | | | | | | | | | | |
| | 5→3.5 Shift | | | | | | | | | | | | | |

| Note | | |
|---|---|---|
| ○ | ON | Engaged |
| × | OFF | Released |
| △ | On Only for Engine Brake | Engaged Only for Engine Brake |

5,779,585

1

HYDRAULIC CONTROL APPARATUS FOR AUTOMATIC TRANSMISSION

BACKGROUND OF THE INVENTION

1. Field of the invention

The present invention relates to a hydraulic pressure control apparatus for an automatic transmission installed in a motor vehicle and, more particularly, to a hydraulic control apparatus for an automatic transmission comprising a first (main) speed shift mechanism and a second (auxiliary) speed shift mechanism that enables shifts between a plurality of speeds by the combined operation of the main speed shift mechanism and the auxiliary speed shift mechanism, using a single pressure regulating valve.

2. Description of the Related Art

The hydraulic control apparatus for an automatic transmission disclosed in examined Japanese patent application publication No. SHO-61-16862, controls the fluid pressure supply to a plurality of friction engagement elements for achieving shifts between a plurality of speeds, using a single impact prevention valve (pressure regulating valve), by supplying regulated fluid pressure from the impact prevention valve controlled by a single pressure regulating solenoid valve, to various hydraulic servos by way of a plurality of shift control valves.

The aforementioned automatic transmission achieves four forward speeds by a combination of a three-speed main shift mechanism and an overdrive shift mechanism. The fourth speed is achieved by shifting the overdrive shift mechanism into overdrive while the main shift mechanism is in the third speed. For that end, the hydraulic control apparatus of the aforementioned automatic transmission locates the 3-4 shift control valve, which controls the overdrive shift mechanism, downstream (in the direction of fluid pressure flow) from the 2-3 shift control valve, so that it is impossible to independently control the 3-4 shift control valve. Moreover, the hydraulic control apparatus does not provide multi-speed shift control of an auxiliary shift mechanism, in this case an overdrive shift mechanism, at a speed other than the third speed.

Another automatic transmission has recently been disclosed which employs a combination of a three-speed main shift mechanism and a three-speed auxiliary shift mechanism to achieve five forward speeds. However, this five-speed transmission may cause problems if an accelerator pedal is depressed (kick down) for acceleration during cruising in fifth speed. If the kick-down results in a downshift to the third speed, the vehicle may rapidly accelerate but the engine speed will soon rise to an overspeed leading to an immediate upshift. If the kick-down results in a downshift to the fourth speed, the torque may be insufficient. In either case, the transmission fails to achieve sufficient acceleration and fails to provide the high power performance and driving comfort expected of a five-speed transmission.

SUMMARY OF THE INVENTION

Accordingly, it is an object of the present invention to provide a hydraulic control apparatus for an automatic transmission that solves the aforementioned problems by employing a relatively simple hydraulic control circuit having a single pressure regulating valve to control both the shift operation of a first (main) shift mechanism and the shift operation of a second (auxiliary) shift mechanism, independently of each other, thus enabling a multi-speed shift operation with shift to an intermediate speed provided between two normally adjacent speeds, for example, in acceleration.

2

Accordingly, the present invention provides a hydraulic control apparatus for an automatic transmission, including: a first speed shift mechanism and a second speed shift mechanism each of which has a plurality of friction engagement elements; and a hydraulic control circuit for achieving a plurality of speeds by selectively supplying fluid pressure to and discharging fluid pressure from hydraulic servo units which operate the plurality of friction engagement elements. The hydraulic control circuit includes a first shift mechanism hydraulic servo (hereinafter "first hydraulic servo") for controlling a friction engagement element provided in the first shift mechanism; a first shift valve for switching supply and discharge of fluid pressure to/from the first hydraulic servo in accordance with various speed signals; a second shift mechanism hydraulic servo (hereinafter "second hydraulic servo") for controlling the friction engagement elements provided in the second shift mechanism; a second shift valve for switching between supply and discharge of fluid pressure to/from the second hydraulic servo in accordance with various speed signals; a fluid pressure source for generating a line pressure; a pressure regulating valve for regulating the line pressure from the fluid pressure source to produce a regulated pressure; and a fluid pressure changeover valve for selectively supplying the line pressure and the regulated pressure to the first and second shift valves.

Since the plural friction engagement elements of the first and second shift mechanisms are controlled by the single pressure regulating valve, the construction of the hydraulic control circuit is simplified. It also becomes possible to selectively supply either the regulated fluid pressure or the line pressure to the first and second shift valves by using the fluid pressure changeover valve, so that the first shift mechanism and the second shift mechanism can be controlled independently of each other. The transmission of the present invention is thereby able to achieve additional speeds, i.e. intermediate speeds between normally achieved speeds, thus improving driving comfort.

In a preferred embodiment the fluid pressure changeover valve has a regulated pressure input port for inputting the regulated fluid pressure from the pressure regulating valve, a line pressure input port for inputting the line pressure from the fluid pressure source, a first output port for output of pressure to the first shift valve, and a second output port for output of pressure to the second shift valve. The fluid pressure changeover valve switches between a first position where the regulated pressure input port and the first output port communicate with each other and the line pressure input port and the second output port communicate with each other, and a second position where the regulated pressure input port and the second output port communicate with each other and the line pressure input port and the first output port communicate with each other.

In the control of the fluid pressure supply to the friction engagement elements, it is normally preferable to utilize the regulated fluid pressure as the engaging pressure until the torque capacity required of the frictional engagement element is reached, and after the engagement is completed, to supply the line pressure thereto in order to achieve maximum torque capacity. Since the line pressure can be supplied to a predetermined friction engagement element of the first or second shift mechanism, it becomes possible to smoothly control the engaging pressure by first utilizing the regulated fluid pressure and by then increasing torque capacity by utilizing the line pressure.

In another preferred embodiment the first shift mechanism receives, as input, drive force from an engine and reduces it to provide a plurality of reduced speeds, and the second shift mechanism receives, as input, output from the first shift mechanism. The second shift valve supplies the fluid pressure from the fluid pressure source to the hydraulic servo that operates a friction engagement element which is engaged when the second shift mechanism is at a predetermined speed. When the second shift mechanism completes a shift to a predetermined speed, the fluid pressure changeover valve switches from the second position where the regulated fluid pressure is supplied to the second shift valve, to the first position where the line pressure from the fluid pressure source is supplied to the second shift valve.

The friction engagement elements of the second shift mechanism receive larger load torques than the friction engagement elements of the first shift mechanism since the second speed shift mechanism receives output speed-reduced by the first shift mechanism. With the aforementioned preferred construction, since the friction engagement elements engaged for a predetermined speed of the second shift mechanism are constantly supplied with the line pressure from the fluid pressure source after the shift control has been completed, the present invention thereby provides sufficiently large torque capacities for the friction engagement elements that engage and receive large load torques during operation in a predetermined speed of the second speed shift mechanism, and eliminates the need to increase the control gain of the pressure regulating valve for a high regulated pressure output comparable to the line pressure, enabling an improvement in the precision of pressure regulation by the pressure regulating valve.

It is also preferred that the first shift mechanism achieve its highest two speeds by engagement or release of one of its friction engagement elements, and that at least after the shift to the highest speed is completed, the fluid pressure changeover valve is held in the same position as assumed during the shift to the highest speed.

In normal operation the highest two speeds are most frequently used in an automatic transmission. It is therefore desirable to achieve shifts without any time lag in shifts between these two highest speeds. Accordingly, in a preferred embodiment, since the highest speed is achieved by controlling the engaging pressure on a predetermined friction engagement element (for example, a direct clutch C2), and the second highest speed is achieved by releasing that predetermined friction engagement element while maintaining the fluid pressure changeover valve in the same position as assumed for the shift to the highest speed (for example, the position for supplying the regulated fluid pressure to the first shift valve), it is possible to control the releasing pressure without need to switch the position of the fluid pressure changeover valve, thus achieving a corresponding reduction in the time lag.

In another preferred embodiment, the transmission is shifted from one speed to another speed by releasing at least one predetermined friction engagement element of the second shift mechanism while a predetermined friction engagement element of the first shift mechanism is maintained in engagement. The first shift valve maintains a first (predetermined) friction engagement element of the first shift mechanism in engagement by supplying fluid pressure to the first hydraulic servo which operates that first friction engagement element, during the shift from the one speed to the other speed. The second shift valve switches to discontinue the supply of the regulated fluid pressure to the second hydraulic servo that operates the second friction engagement element of the second shift mechanism during the shift from the one speed to the other speed. The fluid pressure changeover valve supplies the first shift valve with the fluid pressure from the pressure regulating valve being raised over a second predetermined period of time which begins upon lapse of a first predetermined time period following the discontinuation of supply of the fluid pressure from the pressure regulating valve to the second shift valve, at the time of completion of the shift from the one speed to the other speed.

The releasing pressure for the friction engagement elements (for example, the fourth brake B4) of the second shift mechanism, is normally controlled by changing the engaging pressure on a predetermined friction engagement element (for example, the second brake B2) of the first shift mechanism to the line pressure, using the fluid pressure changeover valve, and by supplying the regulated pressure valve to the second hydraulic servo (24). However, because the regulated pressure is substantially reduced at the end of the shift, there is the danger that, if the fluid pressure changeover valve is switched at this time, the engaging pressure on the predetermined friction engagement element (B2) of the first shift mechanism may become too low. In the aforementioned preferred embodiment, the communication between the fluid pressure source and the second hydraulic servo is blocked by the second shift valve, and after the regulated fluid pressure is raised for a predetermined period of time, the fluid pressure supply passage is connected to the first hydraulic servo, thus preventing too low a pressure on the predetermined friction engagement element.

The present invention preferably further includes: a first fluid passage for supplying the regulated fluid pressure from the pressure regulating valve to the fluid pressure changeover valve; a second fluid passage for supplying the fluid pressure from the fluid pressure changeover valve to at least one of the first and second shift valves; and a third fluid passage connecting the first fluid passage to the second fluid passage to provide a by-pass of the fluid pressure changeover valve, the third fluid passage being provided with connecting means for selectively connecting the first fluid passage and the second fluid passage to each other when the fluid pressure in the second fluid passage becomes less than the fluid pressure in the first fluid passage.

It is normally necessary to supply the line pressure to the friction engagement element that has been initially controllably engaged by the regulated pressure, so as to provide that friction engagement element with a sufficiently large torque capacity. However, during the switching of the fluid pressure changeover valve, the second fluid passage may be disconnected from the fluid pressure source. With aforementioned preferred construction, if the fluid pressure in the second fluid passage becomes lower than the fluid pressure in the first fluid passage during the switching of the fluid pressure changeover valve, the third fluid passage is opened by the connecting means to connect the first fluid passage and the second fluid passage, by-passing the fluid pressure changeover valve. The invention thus prevents a low pressure in the second fluid passage.

The invention may further include: a third (low speed) shift shift valve for achieving a low speed in the first shift mechanism and a fourth shift valve for achieving a predetermined speed in the second shift mechanism. A solenoid valve controls the changeover of the fourth shift valve and is located in a fluid passage which connects the fluid pressure source and the second shift valve. The third shift valve is disposed in the fluid passage, for closing the fluid passage when a low speed is maintained in the first shift mechanism.

When the first shift mechanism is in a low speed state, the friction engagement elements of the second shift mechanism, which are engaged to establish a high speed of the second shift mechanism, receive increased loads because the first speed shift mechanism in the low state inputs increased torque to the second shift mechanism. However, the aforementioned preferred embodiment of the present invention prevents the second shift mechanism from shifting to a higher speed during low speed of the first shift mechanism, by breaking communication between the source pressure and the solenoid valve for switching the shift valve that controls shifting of the second shift mechanism (for example, to the second and third speed, or the third speed). The invention thus increases the service life of the high-speed friction engagement elements of the second shift mechanism.

In the aforementioned construction, it is preferred that the third shift valve in the fluid passage be located between the fluid pressure source and the solenoid valve.

In a circuit design in which the first shift valves are disposed in fluid passages between the solenoid valves and respective second shift valves, the flow loss would be large if a connection between the fluid pressure source and the drain fluid passage was established by the solenoid valve. However, with the aforementioned preferred embodiment of the present invention, when one of the solenoid valves is positioned between the fluid pressure source and the drain fluid passage, the corresponding one of the first shift valves disconnects the fluid pressure source from the drain fluid passage to reduce flow loss.

Preferably, the present invention further includes changeover means for changing the connection of a fourth fluid passage, which fourth fluid passage connects the fluid pressure source with an input port of the pressure regulating valve, between communication with a line pressure supply passage extending from the fluid pressure source and a drain fluid passage; a fifth fluid passage for, when the fluid pressure changeover valve is in a first position, connecting to a regulated pressure passage extending from the pressure regulating valve to supply the regulated pressure to one of the first shift mechanism-side shift valve (first shift valve) and the second shift mechanism-side shift valve (second shift valve) via the fluid pressure changeover valve; a sixth fluid passage for, when the fluid pressure changeover valve is in the first position, connecting to the fourth fluid passage to supply the line pressure from the fluid pressure source to the other of the first and second shift valves via the fluid pressure changeover valve; and a seventh fluid passage provided with connecting means for connecting the regulated pressure passage and the sixth fluid passage to each other when the fluid pressure in the regulated pressure passage is higher than the fluid pressure in the sixth fluid passage.

When it is necessary to maintain friction engagement elements in the released state, for example in the P range, fluid pressure drainage may not be reliably achieved in a conventional automatic transmission wherein the supply of fluid pressure to and release (drainage) of fluid pressure from the hydraulic servos that operate the friction engagement elements is controlled by the pressure regulating valve, because in the "drained" state the fluid pressure of a hydraulic servo may remain at a low pressure depending on the conditions of the pressure regulating valve (the relationship between its spool and spring). With the aforementioned preferred construction, the regulated fluid pressure is conducted to the sixth fluid passage by the connecting means, such as a check valve, and to the fourth fluid passage by the fluid pressure changeover valve (b→21d→21c→a→d$_2$→45→c→21f→21e→i), and the fourth fluid passage is drained by the changeover means (for example, a manual valve). The invention thus ensures the drainage of the fluid pressure from the fifth fluid passage (b) connecting to the hydraulic servos.

In a further preferred embodiment of the invention, while a first friction engagement element of the first speed shift mechanism and a second friction engagement element of the second speed shift mechanism are maintained in engagement, the hydraulic control apparatus shifts from a first speed to a second speed by releasing a third friction engagement element of the first speed shift mechanism from engagement. During the shift from said first speed to said second speed, the second shift valve maintains the second friction engagement element of the second speed shift mechanism in engagement by supplying fluid pressure to the second hydraulic servo. During this shift from said "first" speed to a "second" speed, the first shift valve changes over to discontinue the supply of the fluid pressure from the pressure regulating valve to a third hydraulic servo that operates the third friction engagement element of the first shift mechanism and also changes the fluid pressure to the first servo from the regulated pressure to the line pressure. The hydraulic control apparatus includes a changeover valve for selectively supplying the fluid pressure from the first shift valve to either the first hydraulic servo or the second hydraulic servo, the changeover valve supplying the first hydraulic servo with the fluid pressure supplied to the second hydraulic servo when the fluid pressure from the first shift valve to the first hydraulic servo becomes less than the fluid pressure supply to the second hydraulic servo.

In a shift from the highest speed down to the next speed, with control of the releasing pressure on a predetermined (third) friction engagement element (for example, C2) of the first shift mechanism, it is necessary to maintain both a predetermined (second) friction engagement element (for example, C3) of the second shift mechanism and another (first) friction engagement element (for example, B2) of the first shift mechanism in engagement. Conventionally, in this control operation, the first friction engagement element (32) is maintained in engagement by supplying the line pressure thereto via the first shift valve, but after the shift, a low pressure may remain in the first hydraulic servo (B-2) which operates the first friction engagement element (B2) because the switching of the first shift valve, after the shift, connects the hydraulic servo (B-2) to a fluid passage whose pressure has been reduced by pressure regulation. However, the aforementioned preferred embodiment of the present invention includes a changeover valve (39) for selectively supplying either the first hydraulic servo (B-2) with the fluid pressure from the first shift valve or the line pressure to the second hydraulic servo (C-3). The changeover valve (for example, a two-way check valve) supplies the first hydraulic servo (B-2) with the fluid pressure supplied to the second hydraulic servo (C-3) if the fluid pressure from the first shift valve becomes lower than the line pressure supplied to the second hydraulic servo (C-3). Thus, the invention prevents a low pressure from remaining in the first hydraulic servo even if the first hydraulic servo is connected to the regulated pressure fluid passage by the switching of the first shift valve after a shift operation.

The operation of the hydraulic control circuit for an automatic transmission of the invention will now be briefly described. The reference numerals in the parentheses in the description which follows are given merely for the purpose of facilitating reference to the accompanying drawings and are not intended to limit the invention as otherwise described. To achieve a predetermined speed by engaging or releasing the friction engagement elements of the first shift mechanism (2), the fluid pressure changeover valve (21) is switched to the position where the regulated pressure input port (21c) and the first output port (21d) are connected in communication. In this position, the regulated pressure from the pressure regulating valve (20) is supplied by the first shift valves (23, 25) to the hydraulic servo of the friction engagement element of the first shift mechanism (2) to be engaged or released, thus smoothly controlling the engagement or release of the friction engagement element. Since the line pressure input port (21e) and the second output port (21f) are in open communication in this case, the line pressure is supplied to the second shift valves (26, 27), so that the second shift mechanism (5) is maintained at a predetermined speed.

To achieve a predetermined speed by engaging or releasing the friction engagement elements of the second shift mechanism (5), the fluid pressure changeover valve (21) is switched to the position where the regulated pressure input port (21c) and the second output port (21f) are connected in communication. In this position, the regulated pressure from the pressure regulating valve (20) is supplied by the second shift valves (26, 27) to the hydraulic servo of the friction engagement element of the second shift mechanism (2) to be engaged or released, thus smoothly controlling the engagement or release of the friction engagement element. Since the line pressure input port (21d) and the first output port (21d) are connected, the line pressure is supplied to the first shift valves (23, 25), so that the first shift mechanism (2) is maintained at a predetermined speed.

Thus the first shift mechanism (2) and the second shift mechanism (5) are able to shift to desired speeds separately without affecting each other. For example, a shift of the second shift mechanism (5) to the 1st speed while the first shift mechanism is maintained at the highest speed (3rd speed) will achieve a 3rd speed low that is lower than the 3rd speed achieved by the combination of the 2nd speed of the first shift mechanism (2) and the 2nd speed of the second shift mechanism (5). A shift of the second shift mechanism (5) to the 2nd speed while the first shift stage is maintained at the highest speed will achieve a 4th speed low that is lower than a 4th speed achieved by the combination of the 2nd speed of the first shift mechanism (2) and the highest speed (3rd speed) of the second shift mechanism (5).

BRIEF DESCRIPTION OF THE DRAWINGS

The foregoing and further objects, features and advantages of the present invention will become apparent from the following description of preferred embodiments with reference to the accompanying drawings, wherein:

FIGS. 2 and 3 connect at line A—A in FIG. 2;

FIG. 4 is a chart of the operations of the solenoid valves, clutches and brakes of the automatic transmission of FIG. 1;

DETAILED DESCRIPTION OF PREFERRED EMBODIMENT

A preferred embodiment of the present invention will be described hereinafter with reference to the accompanying drawings.

Figure 1:
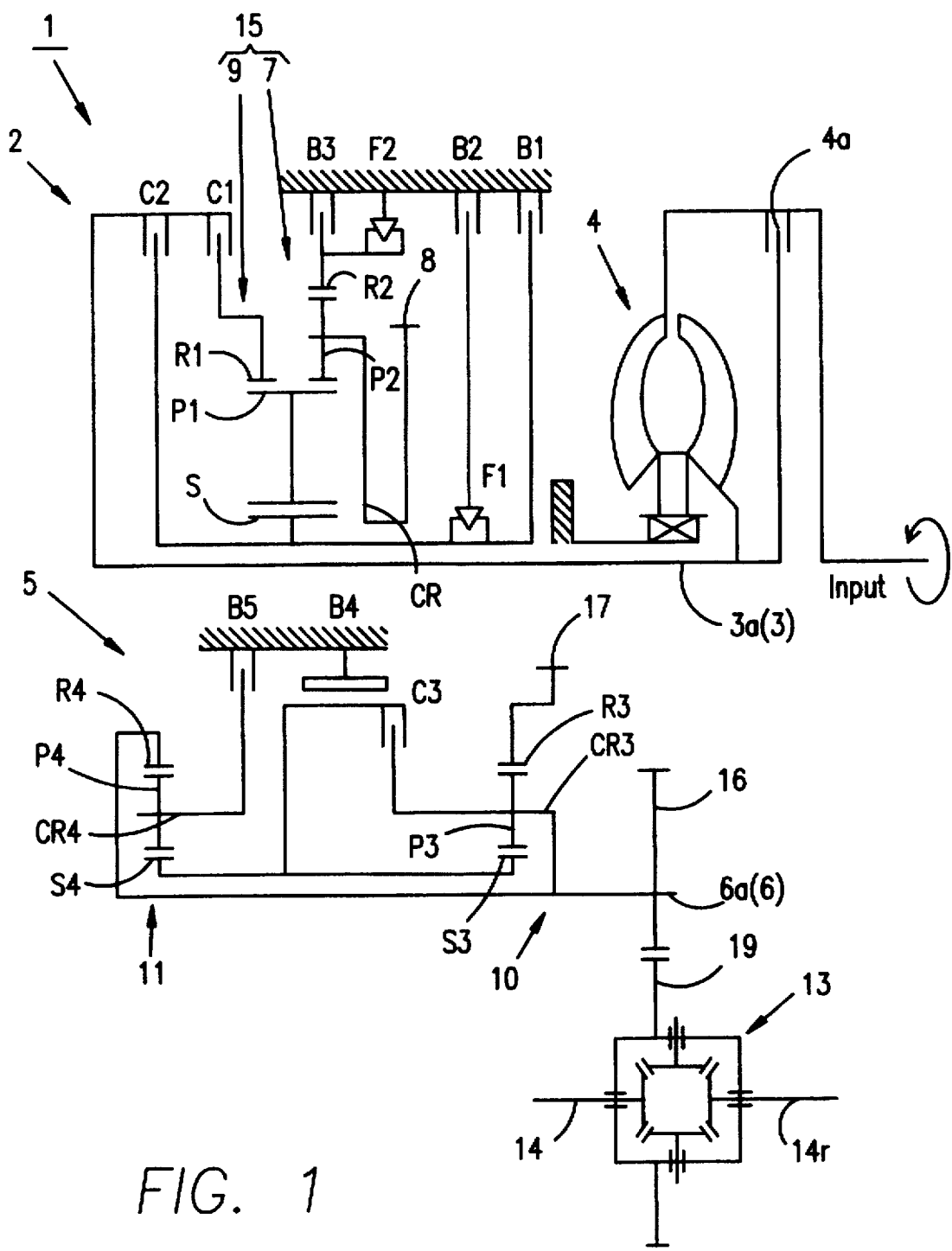
FIG. 1 is a skeletal diagram of an automatic transmission comprising a main speed shift mechanism and an auxiliary speed shift mechanism.

Referring to FIG. 1, a 5-speed automatic transmission 1 includes a torque converter 4, a 3-speed main speed shift mechanism 2, a 3-speed auxiliary speed shift mechanism 5 and a differential 13 which are joined together and contained in an integrally built case. The torque converter 4 includes a lockup clutch 4a and operates to transmit torque from an engine crank shaft to the main speed shift mechanism 2 either fluidically through the fluid within the torque converter 4 or through the mechanical connection achieved by the lockup clutch. The integral case rotatably supports a first shaft 3 (specifically, an input shaft 3a), a second shaft 6 (counter shaft 6a) disposed parallel to the first shaft 3, and a third shaft 14 (right and left shafts 14l, 14r). A valve body is disposed on the outer face of the case.

The main speed shift mechanism 2 has a planetary gear unit 15 composed of a first simple planetary gear set 9 and a double-pinion planetary gear set 7. The first simple planetary gear set 9 is made up of a long sun gear S, a ring gear R1, and a carrier CR supporting pinions P1 meshed with the sun gear S and the ring gear R1. The pinions P1 are formed as long pinions. The double-pinion planetary gear set 7 includes a ring gear R2 and shares the same sun gear S and the same carrier CR which supports the same pinion P1 meshed with the sun gear S and pinion P2 meshed with the ring gear R2 so that the pinions P1 and P2 mesh.

The input shaft 3a, operatively connected to the engine crank shaft by the torque converter 4, can be connected to the ring gear R1 of the first simple planetary gear set 9 by a first (forward) clutch C1, and to the common sun gear S by a second (direct) clutch C2. The sun gear S can be stopped directly by a first brake B1, and it can also be stopped by a second brake B2 by way of a first one-way clutch F1. The ring gear R2 of the double-pinion planetary gear set 7 can be stopped by a third brake B3 and also by a second one-way clutch F2. The carrier CR is fixed to a counter drive gear 8.

The auxiliary speed shift mechanism 5 comprises an output gear 16, and first and second Simpson type simple planetary gear sets 10 and 11 which are disposed in the named order toward the rear along the axis of the counter shaft 6a forming the second shaft 6. The counter shaft 6a is rotatably supported by the integral case through bearings.

The ring gear R3 of the first simple planetary gear set 10 is connected to a counter driven gear 17 meshed with the counter drive gear 8. The sun gear S3 is rotatably supported by the counter shaft 6a. The pinions P3 are supported on both sides by a carrier CR3 which is a flange firmly fixed to the counter shaft 6a. The carrier CR3 is connected to an inner hub of a UD direct clutch C3. The sun gear S4 of the second simple planetary gear set 11 is connected to the sun gear S3 of the first simple planetary gear set. The ring gear R4 of the second simple planetary gear set 11 is connected to the counter shaft 6a.

The UD direct clutch C3 is disposed between the carrier CR3 of the first simple planetary gear set and the coupled sun gears S3, S4. The coupled sun gears S3, S4 can be stopped by a fourth brake B4 which is a band brake. The carrier CR4 of the second simple planetary gear set supporting the pinions P4 can be braked by a fifth brake B5.

The differential 13 is disposed on the third shaft 14 which serves as a front axle. The differential 13 has a ring gear 10 meshed with the output gear 16, and transmits rotation from the ring gear to right and left wheel axles 14*l*, 14*r*.

A hydraulic control circuit used for the 5-speed automatic transmission will be described with reference to FIGS. 2 and 3, each of which shows a half of the circuit. In the drawings, "No. 1", "No. 2", "No. 4", and "No. 5" denote on-off controlled solenoid valves; and SLU, SLS and SLT denote linear solenoid valves. The solenoid valve No. 1 is normally open; the solenoid valve No. 2 is normally closed; the solenoid valve No. 3 is normally closed; the solenoid valve No. 4 is normally open; and the solenoid valve No. 5 is normally closed. The linear solenoid valve SLT is operated corresponding to the throttle opening responsive to accelerator pedal operation by an operator.

Figure 2:
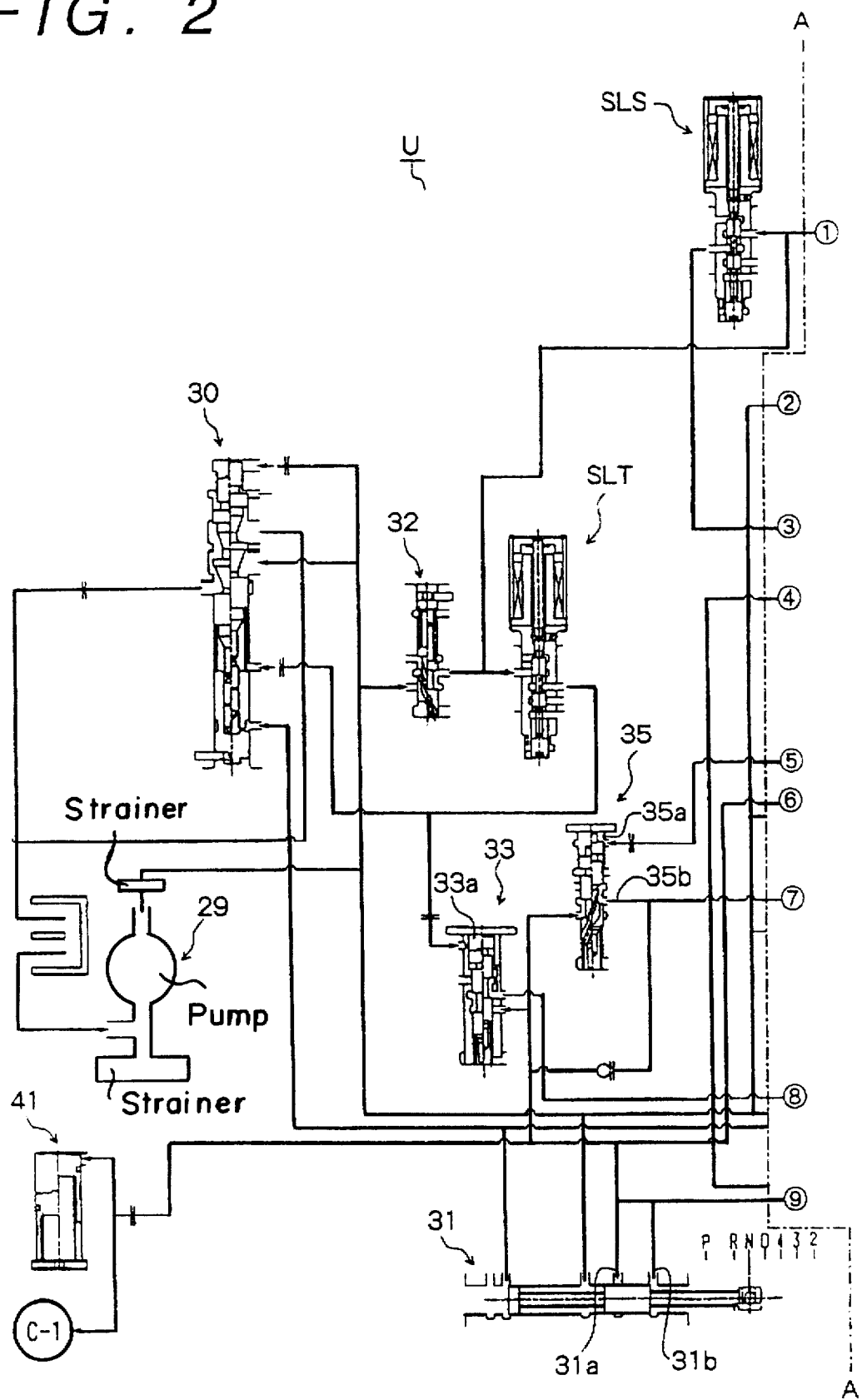
FIGS. 2 and 3 show a hydraulic control circuit for control of the automatic transmission of FIG. 1.
Figure 3:
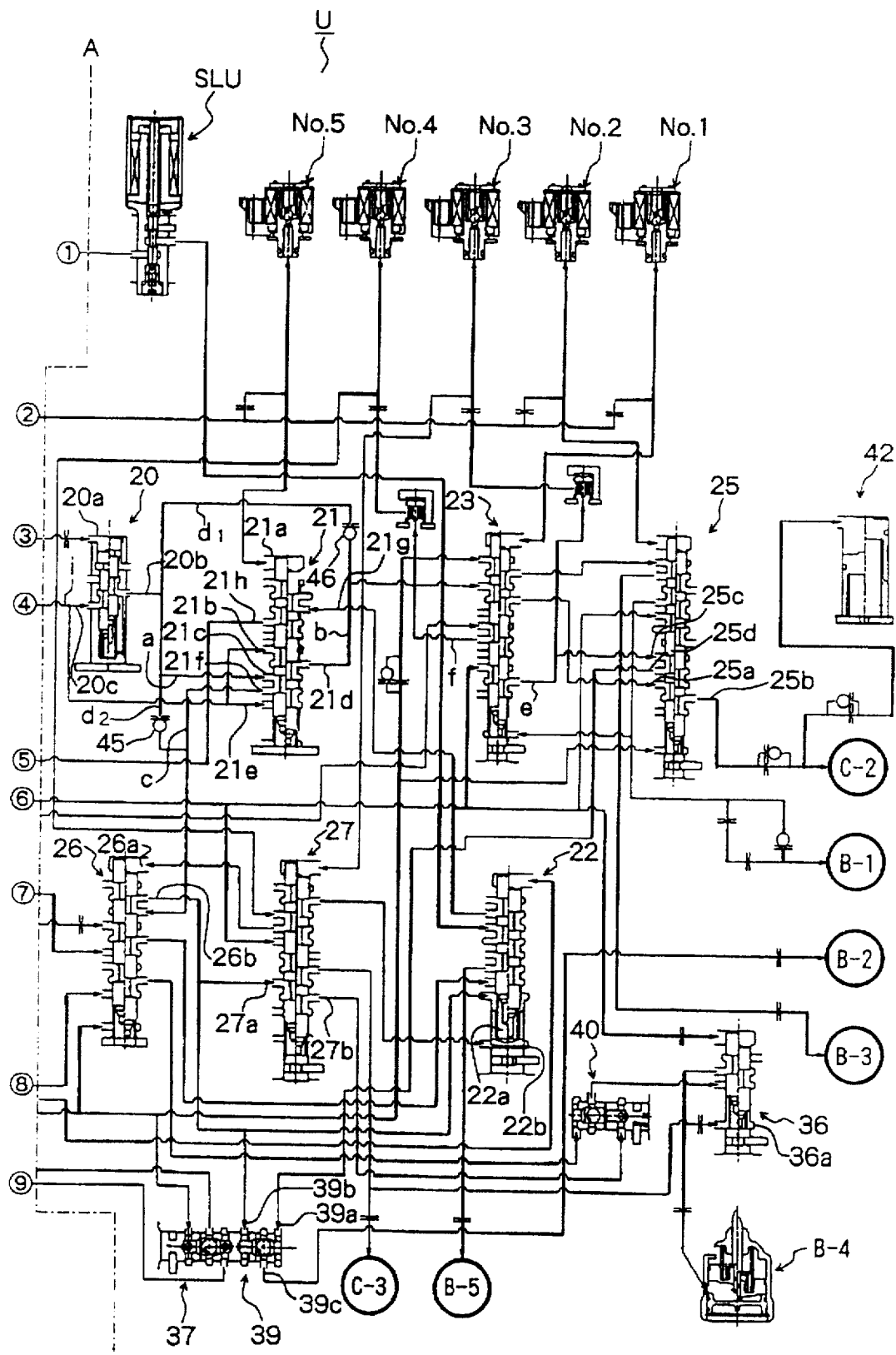

As seen in FIGS. 2 and 3 the hydraulic control circuit further includes a shift pressure control valve (pressure regulating valve) 20, a pressure relay valve (fluid pressure changeover valve) 21, a solenoid relay valve 22, a first (M1) shift valve 23 for the main speed shift mechanism, a second (M2) shift valve 25 for the main speed shift mechanism, a first (U1) shift valve 26 for the auxiliary speed shift mechanism, and a second (U2) shift valve 27 for the auxiliary speed shift mechanism. The shift pressure control valve 20 has a control fluid chamber 20a that receives a control fluid pressure from the linear solenoid valve SLS so that the shift pressure control valve 20 suitably regulates the line pressure from a port 20c of the shift pressure control valve and outputs the regulated pressure from an output port 20b. The control fluid chamber 21a of the pressure relay valve 21 receives an on-off fluid pressure from the solenoid valve No. 5 so that the pressure relay valve 21 correspondingly connects either a line pressure input port 21b receiving the line pressure PL or a regulated pressure port 21c receiving the regulated pressure from the output port 20b to a main speed shift mechanism (M)-side output port 21d, and correspondingly connects the regulated pressure input port 21c or another line pressure input port 21e to an auxiliary speed shift mechanism (U)-side output port 21f.

FIGS. 2 and 3 further show a hydraulic pump 29, a primary regulator valve 30, a manual valve 31, a solenoid modulator valve 32, a B-4 control valve 33, a B-5 control valve 35, a 3–4 timing valve 36, a DR check valve 37, a B-2 check valve 39, and a B-4 check valve 40. Hydraulic servos C-1, C-2, C-3 operate the corresponding clutches C1, C2, C3, and hydraulic servos B-1, B-2, B-3, B-4 operate the corresponding brakes. Accumulator 41 and 42 are provided for the servos C-1 and C-2, respectively.

The operation of this embodiment will now be described with reference to FIGS. 1 and 4.

For the first (1st) speed in the D (drive) range, the forward clutch C1 engages and the second one-way clutch F2 and the fifth brake B5 operate so that the ring gear R2 of the double-pinion planetary gear set and the carrier CR4 of the second simple planetary gear set are prevented from rotating. In this state, the rotation of the input shaft 3a is transmitted to the ring gear R1 of the simple planetary gear set by the forward clutch C1. Since the ring gear R2 of the double-pinion planetary gear set is braked, the common carrier CR rotates in the forward direction at a considerably reduced speed while the sun gear S idly rotates in the reverse direction. Thus, the main speed shift mechanism 2 is in the first speed state. The reduced rotation is then transmitted to the ring gear R3 of the first simple planetary gear set of the auxiliary speed shift mechanism 5 by the counter gears 8, 17. Since the carrier CR4 of the second simple planetary gear set of the auxiliary speed shift mechanism 5 is stopped by the fifth brake B5, thus establishing the first speed state for the auxiliary speed shift mechanism 5, the auxiliary speed shift mechanism 5 further reduces the speed of the rotational input from the main speed shift mechanism 2 and outputs the further reduced rotation from the output gear 16.

For the second (2nd) speed, the second brake B2 (and the first brake B1) engages in addition to the forward clutch C1. Furthermore, the second one-way clutch F2 is disengaged and the first one-way clutch F1 engages instead while the fifth brake B5 continues to be engaged. In this state, the common sun gear S is stopped by the second brake B2 and the first one-way clutch F1 (and the first brake B1), so that the rotation of the ring gear R1 of the simple planetary gear set transmitted from the input shaft 3a by the forward clutch C1 rotates the carrier CR at a reduced speed in the forward direction while idly rotating the ring gear R2 of the double-pinion planetary gear set in the forward direction. The reduced rotation is then transmitted to the auxiliary speed shift mechanism 5 by the counter gears 8, 17. The main speed shift mechanism 2 is thus in the second speed state while the auxiliary speed shift mechanism 5 is in the first speed state due to the engagement of the fifth brake B5. The combination of the second speed state and the first speed state achieves second speed overall for the entire automatic transmission 1.

For the third (3rd) speed, the forward clutch C1, the second brake B2 and the first one-way clutch F1 (and the first brake B1) are maintained in engagement, but the fifth brake B5 is released from engagement and the fourth brake B4 is engaged. That is, the state of the main speed shift mechanism 2 remains unchanged, so that rotation is transmitted to the auxiliary speed shift mechanism 5 by the counter gears 8, 16 in the same manner as in the second state. In the auxiliary speed shift mechanism 5, the rotation from the ring gear R3 of the first simple planetary gear set is output as second speed rotation from the carrier CR3 because the sun gear S3 is fixed. The combination of the second speed of the main speed shift mechanism 2 and the second speed of the auxiliary speed shift mechanism 5 achieves third speed overall for the entire automatic transmission 1.

For the fourth (4th) speed, the main speed shift mechanism 2 remains in the same state as for the second and third speeds, wherein the forward clutch C1, the second brake B2 and the first one-way clutch F1 (and the first brake B3) are engaged, but the auxiliary speed shift mechanism 5 releases the fourth brake B4 and engages the UD direct clutch C3. In this state, the ring gear R3 of the first simple planetary gear set and the sun gears S3, S4 are coupled to achieve locked-up rotation in which the planetary gear sets 10, 11 integrally rotate together. The combination of the second speed of the main speed shift mechanism 2 and the locked-up rotation (third speed) of the auxiliary speed shift mechanism 5 results in fourth speed overall for the entire automatic transmission output from the output gear 16.

For the fifth (5th) speed, the forward clutch C1 and the direct clutch C2 engage to transmit the rotation of the input shaft 3 to both the ring gear R1 of the simple planetary gear set and the sun gear S. The main speed shift mechanism 2 thus undergoes locked-up rotation wherein its gear units rotate together. The auxiliary speed shift mechanism 5 remains in the locked-up rotational state, wherein the UD direct clutch C3 is engaged. The combination of the third speed (locked-up rotation) of the main speed shift mechanism 2 and the third speed (locked-up rotation) of the auxiliary speed shift mechanism 5 results in the fifth speed overall which is output from the output gear 16.

Furthermore, this automatic transmission provides intermediate speeds that are put in effect during downshifts for acceleration and the like, that is, a third speed low (an intermediate speed between the third and second speeds, referred to as "2.5th speed") and a fourth speed low (that is, an intermediate speed between the fourth and third speeds, referred to as "3.5th speed").

For the 2.5th speed, the forward clutch C1 and the direct clutch C2 engage (the second brake B2 also engages but the braking effect is canceled by the one-way clutch F1). Thus the main shift mechanism 2 assumes the third speed state, wherein the planetary gear unit 15 is locked up. The auxiliary speed shift mechanism 5 engages the fifth brake B5, assuming the first speed state. With the combination of the third speed state of the main shift mechanism 2 and the first speed state of the auxiliary shift mechanism 5, the automatic transmission 1 achieves the intermediate speed whose gear ratio is set between those of the second and third speeds, i.e. 2.5th speed.

For the 3.5th speed, the main shift mechanism 2 assumes the third speed (locked-up) state as for the 2.5th speed, wherein the forward clutch C1 and the direct clutch C2 are engaged. On the other hand, the auxiliary shift mechanism 5 assumes the second speed state, wherein the fourth brake B4 is engaged and the sun gear S3 of the first simple planetary gear set 10 is fixed. With the combination of the third speed state of the main shift mechanism 2 and the second speed state of the auxiliary shift mechanism 5, the automatic transmission 1 achieves the intermediate speed whose gear ratio is set between those of the third and fourth speeds, i.e. the 3.5th speed.

The R (reverse) range can be established by the automatic transmission 1 at a critical vehicle speed of 7 km/h or less. If the vehicle is running forward at 7 km/h or higher, the main speed shift mechanism 2 assumes a free rotating state as in the N (neutral) range. If the vehicle speed is not higher than 7 km/h, that is, if the vehicle is substantially stopped, the direct clutch C2 and the third brake B3 engage, and the fifth brake B5 also engages. In this state, the rotation of the input shaft 3a is transmitted to the sun gear S by the direct clutch C2, and the carrier CR reversely rotates while the ring gear R1 of the simple planetary gear set idles also in the reverse direction, since the ring gear R2 of the double-pinion planetary gear set is stopped by the third brake B3. The reverse rotation of the carrier CR is transmitted to the auxiliary speed shift mechanism 5 by the counter gears 8, 16. The auxiliary speed shift mechanism 5 is maintained in the first speed state, where the carrier CR4 of the second simple planetary gear set is braked in both directions by the fifth brake B5. With the combination of reverse rotation of the main speed shift mechanism 2 and the first speed rotation of the auxiliary speed shift mechanism 5, the automatic transmission 1 outputs reverse speed-reduced rotation from the output shaft The shift operations in the transmission of the present invention, will next be described. Since shifts can be between many different combinations of speed stages, shown as "Shift" in FIG. 4, only typical shifts will be described, that is, the 2nd-to-3rd shift, the 3rd-to-2nd shift, the 5th-to-2.5th (3rd low) shift, and the 5th-to-3.5th (4th low) shift. Other shifts will be omitted from the description since they are similar to these typical shifts.

Figure 5:
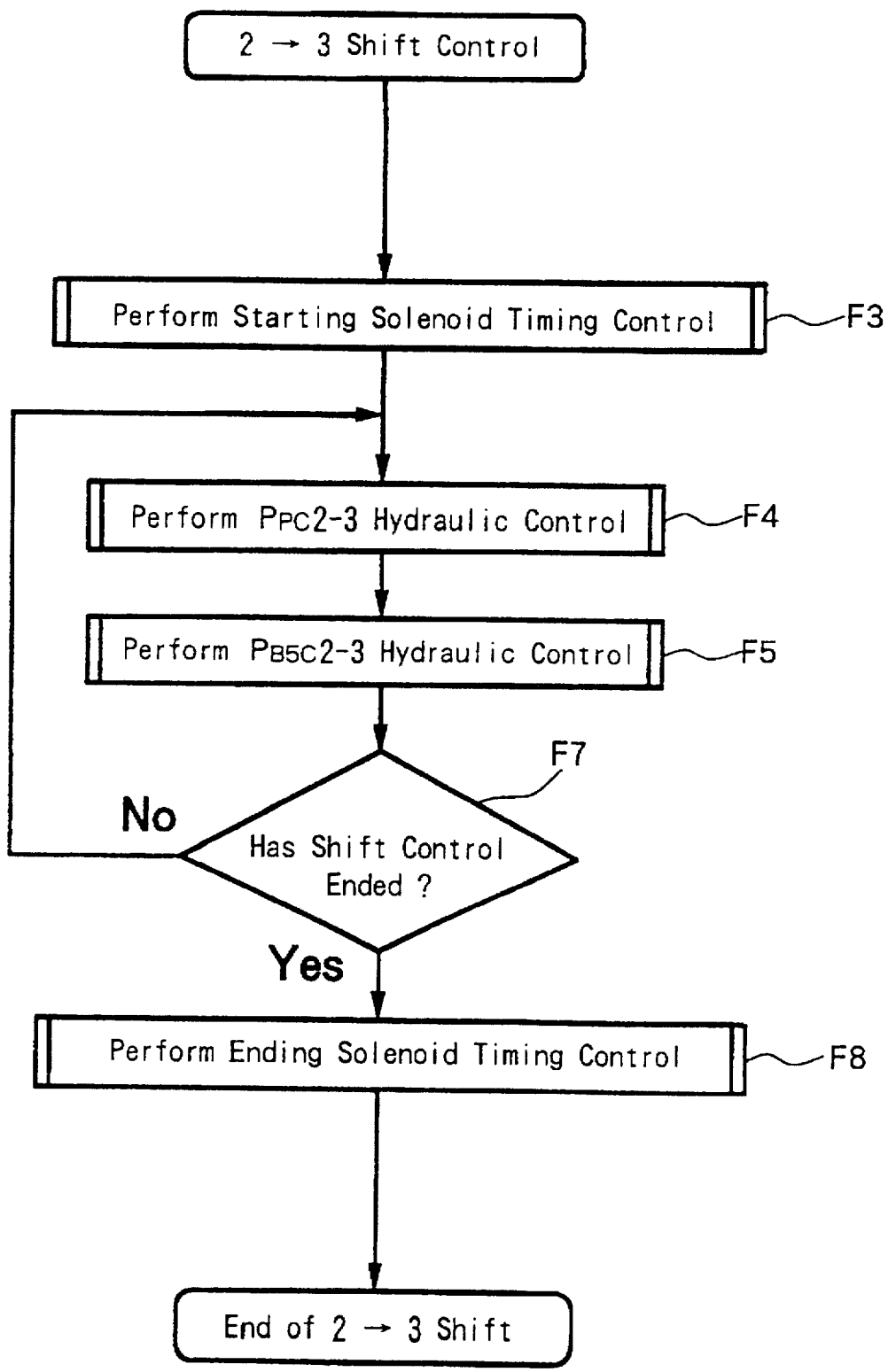
FIG. 5 is a flowchart of a routine for 2nd-to-3rd shift control.

Referring to FIG. 5, the 2nd-to-3rd shift operation includes starting solenoid timing control (F3), regulated pressure ($P_{PC}$2–3) control (F4), and then fifth brake ($P_{BSC}$2–3) hydraulic control (F5). To complete the shift operation (F7), ending solenoid timing control (F8) for maintaining the third speed state is performed before the end of the 2nd-to-3rd shift control. In the 2nd-to-3rd shift control, the main speed shift mechanism 2 remains unchanged in the same state but the auxiliary speed shift mechanism 5 releases the fifth brake B5 and engages the fourth brake B4, as described above. Since no one-way clutch is involved in this shift, the 2nd-to-3rd shift is performed as a so-called clutch-to-clutch shift, which requires pressure regulating control for the engagement changeover in order to prevent shift shock.

Figure 6:
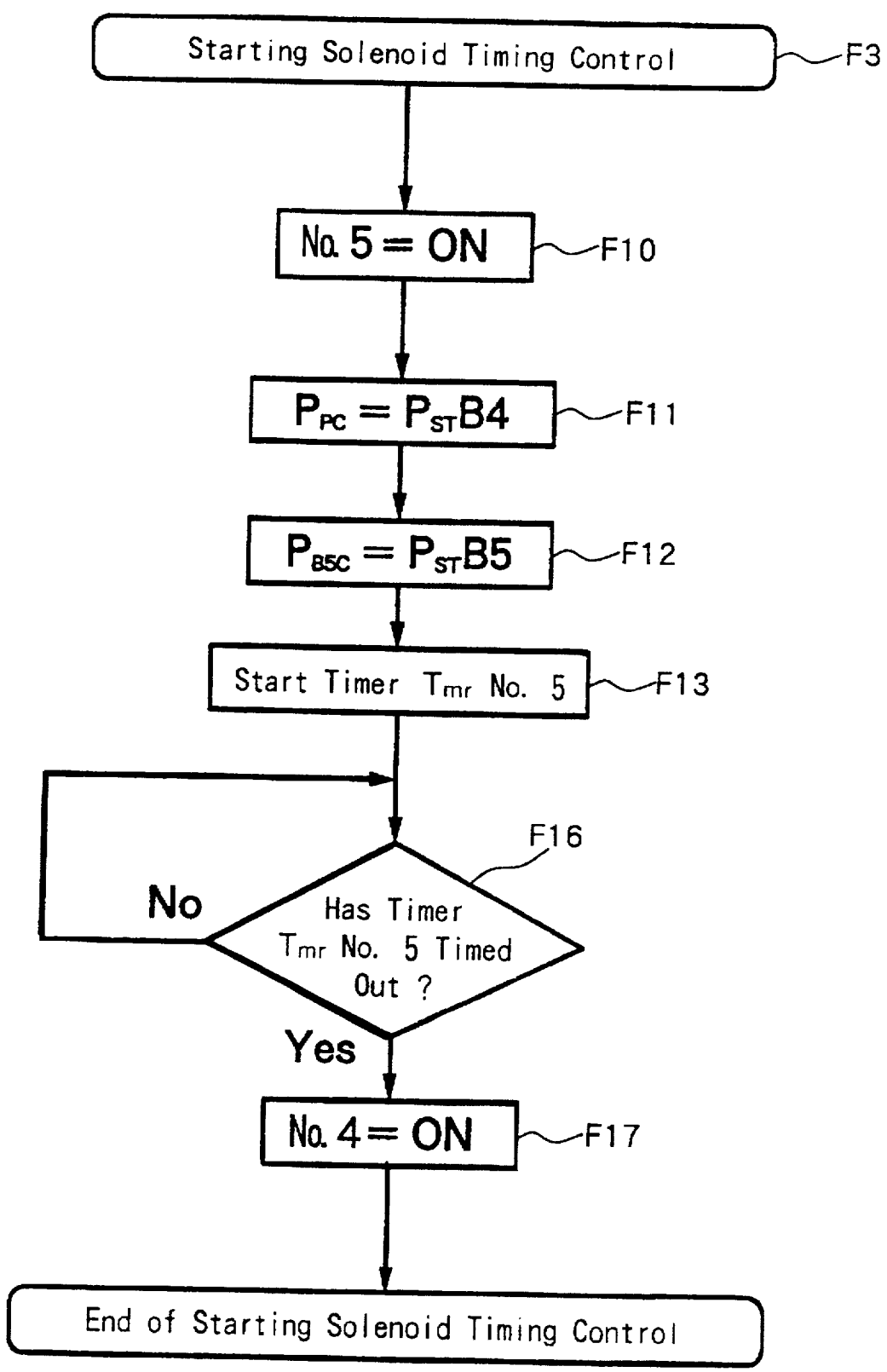
FIG. 6 is a flowchart of a subroutine for the solenoid timing control (step F3) at the start of the 2nd-to-3rd shift control.
Figure 8:
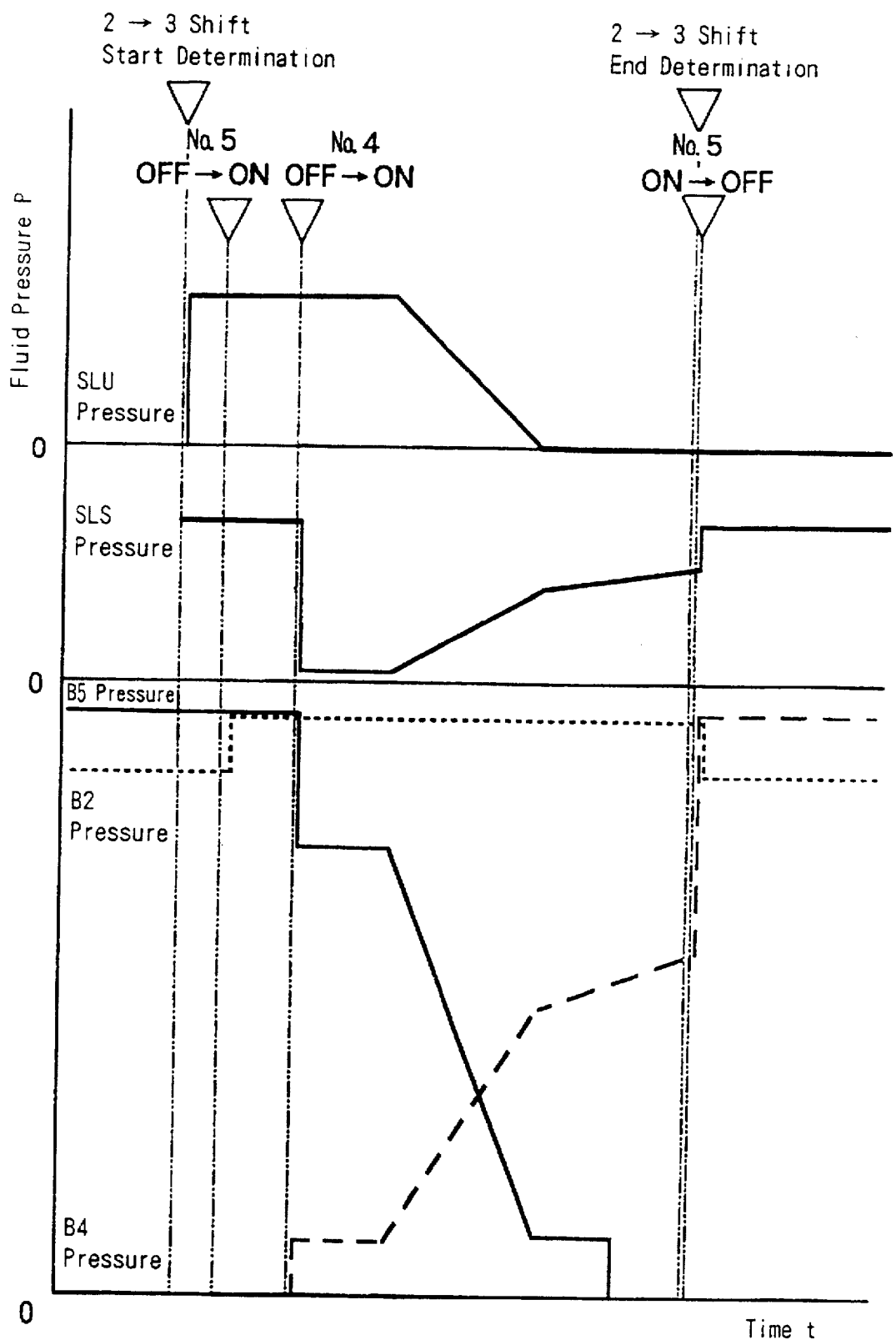
FIG. 8 is a timing chart for the 2nd-to-3rd shift control.
Figure 9:
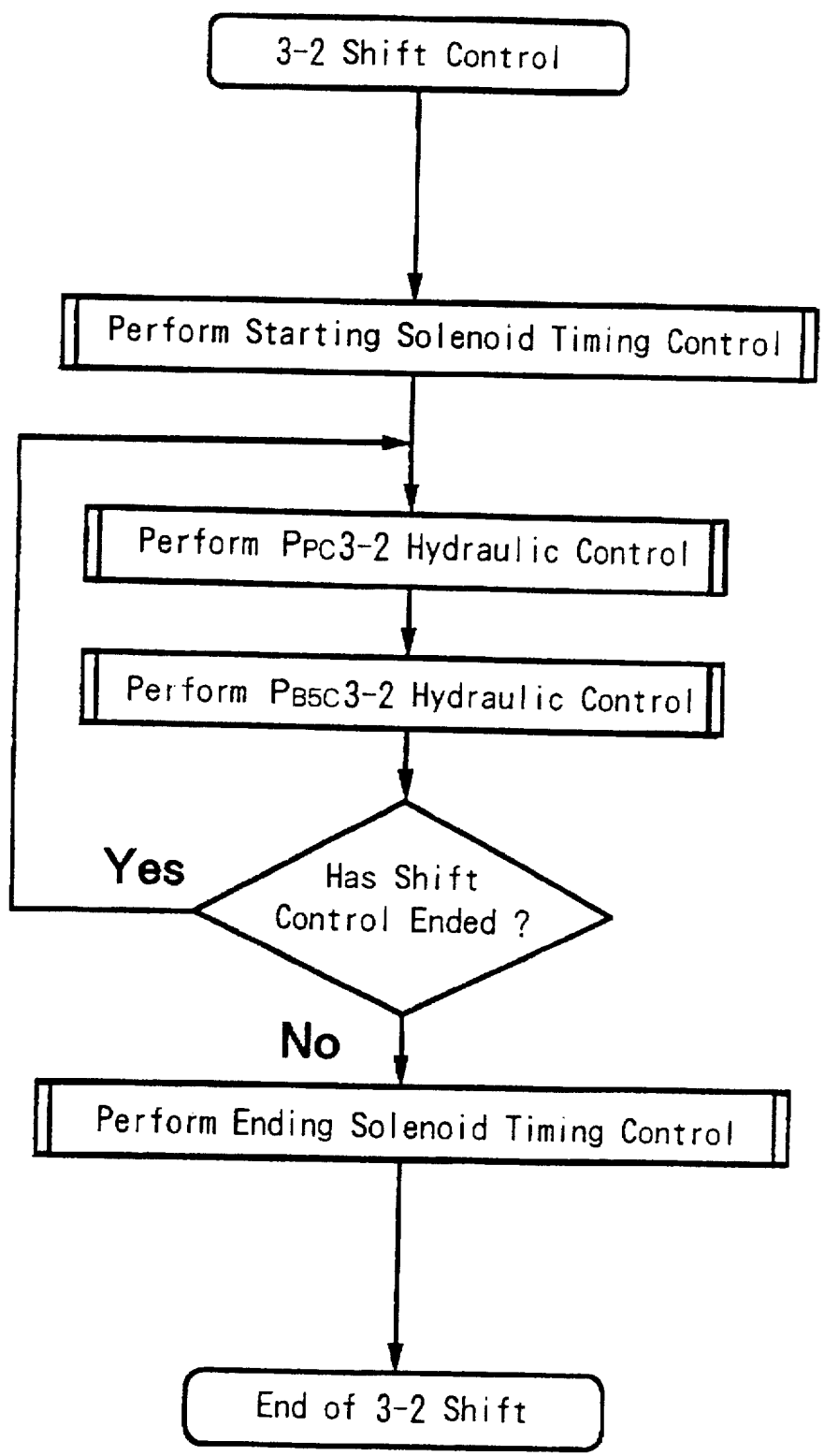
FIG. 9 is a flowchart of a routine for the 3rd-to-2nd shift control.
Figure 10:
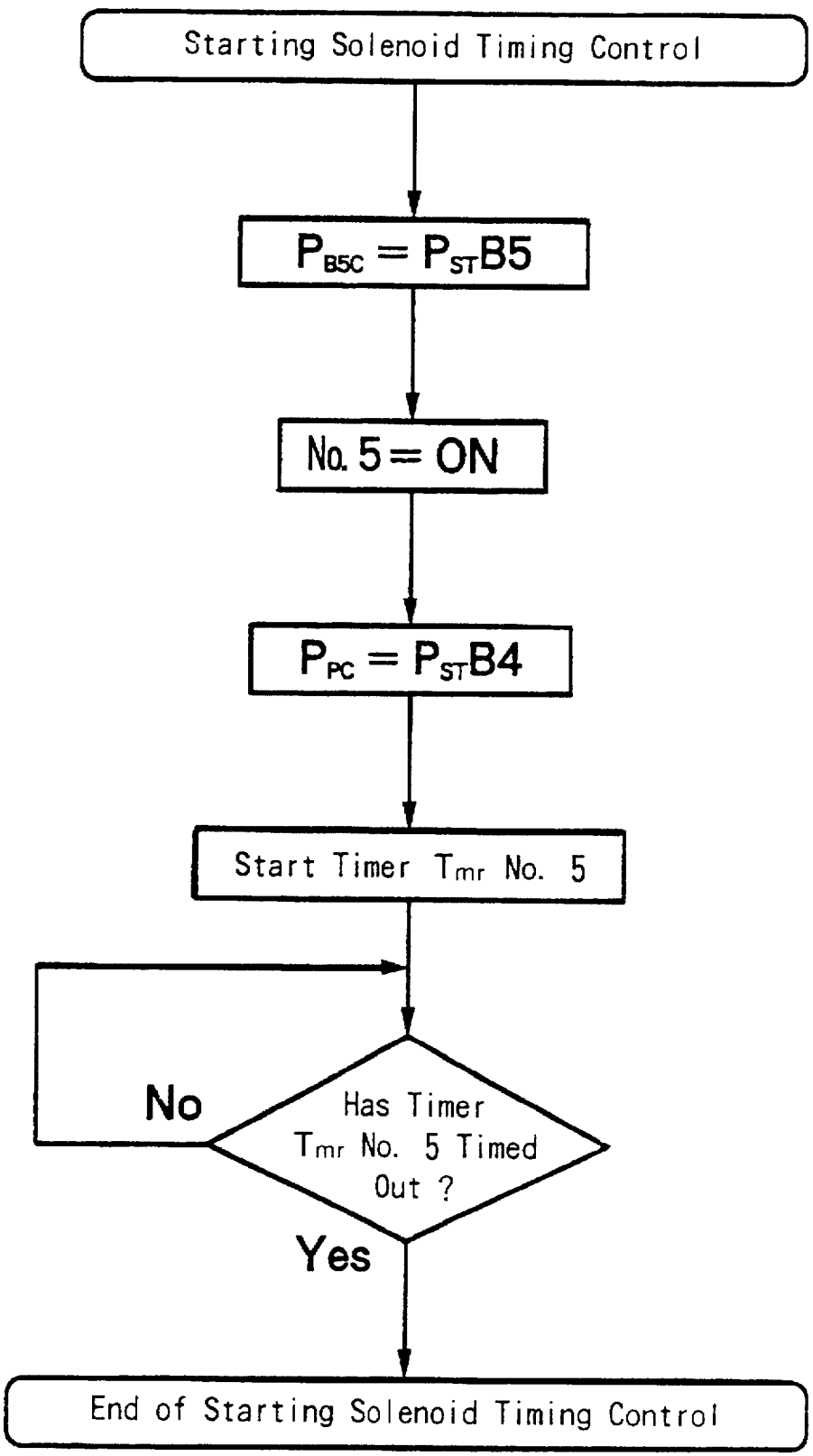
FIG. 10 is a flowchart of a subroutine for the solenoid timing control (step G3) at the start of the 3rd-to-2nd shift control.
Figure 11:
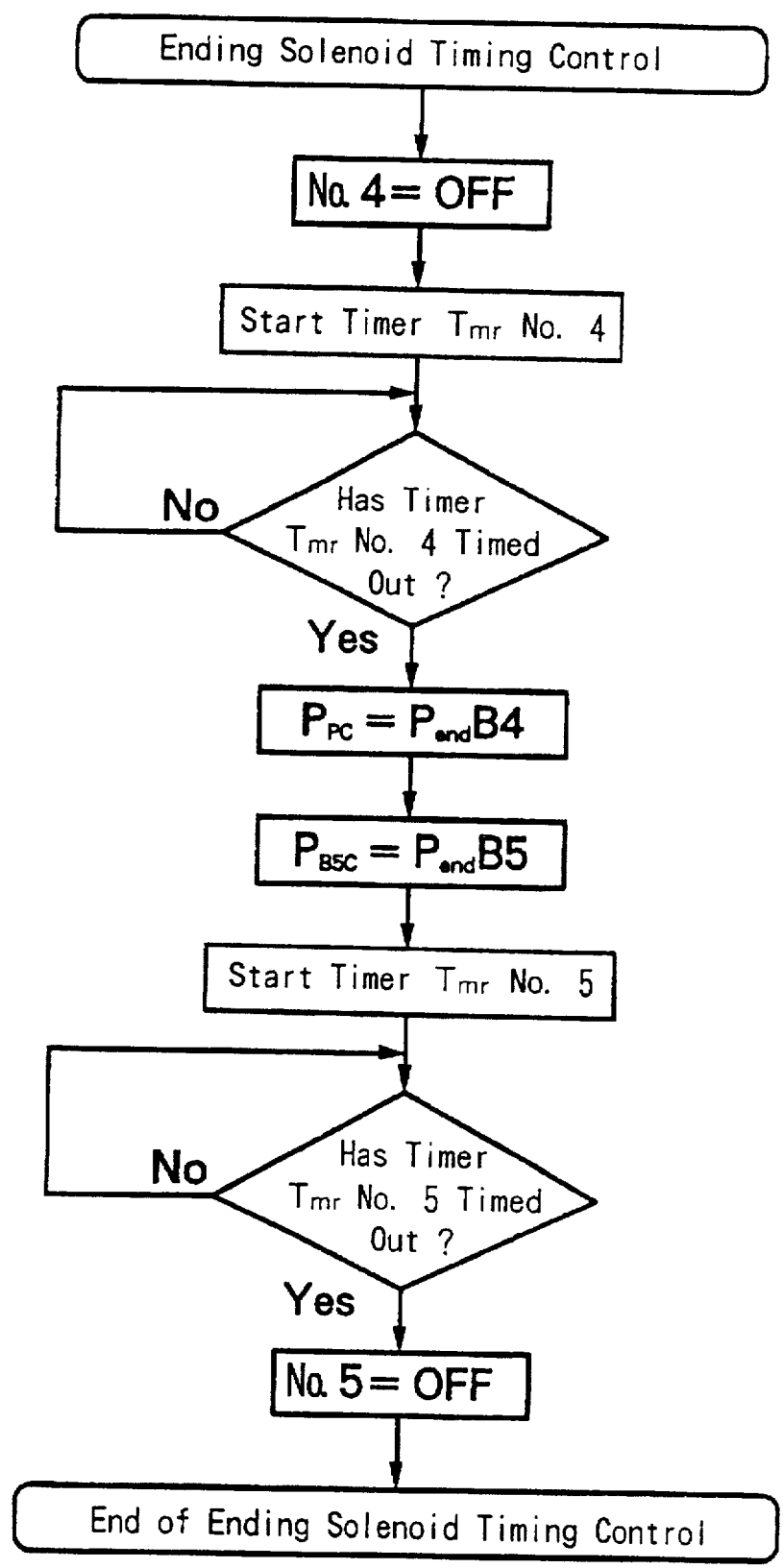
FIG. 11 is a flowchart of a subroutine for the solenoid timing control (step G7) at the end of the 3rd-to-2nd shift control.
Figure 12:
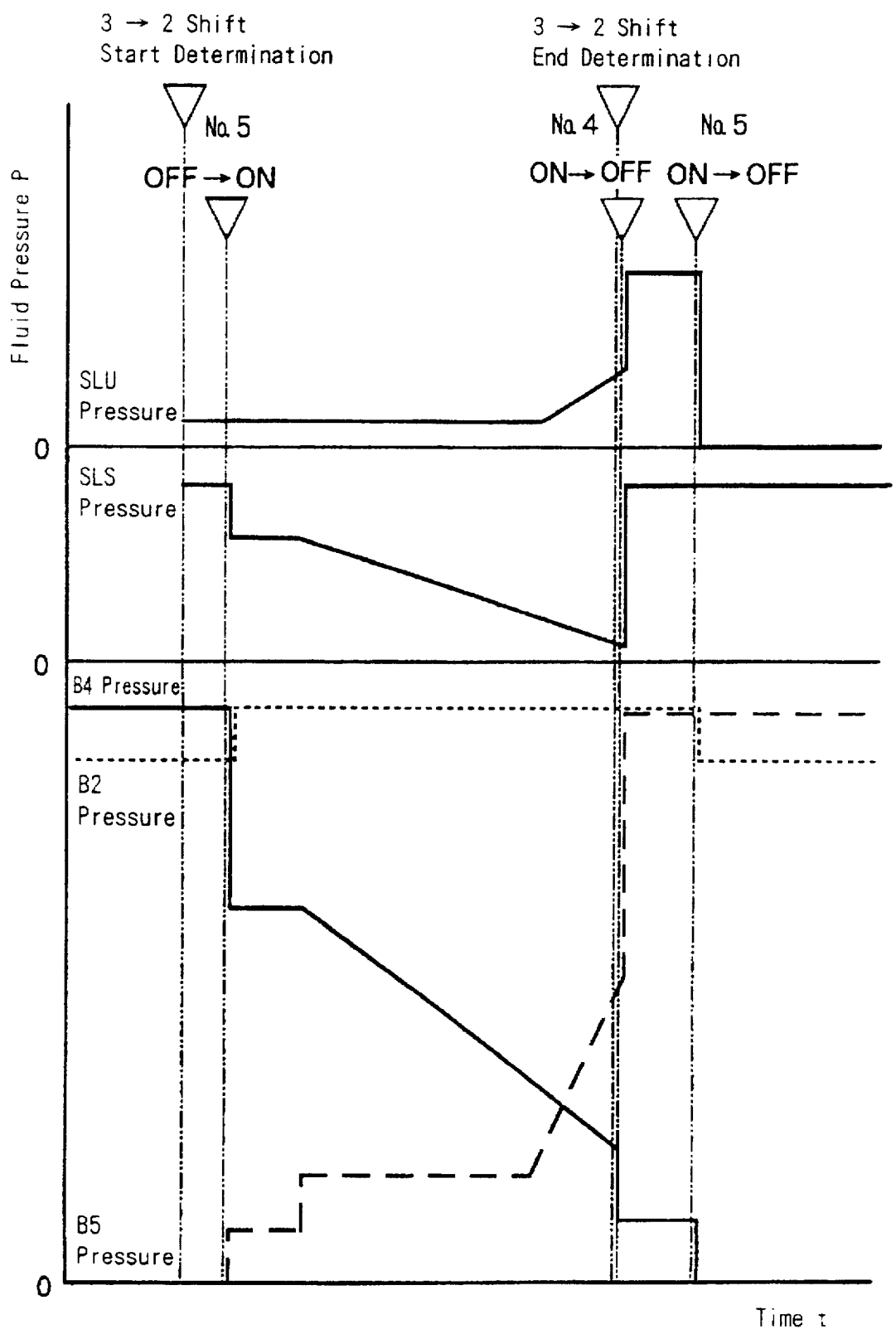
FIG. 12 is a timing chart for the 3rd-to-2nd shift control.
Figure 13:
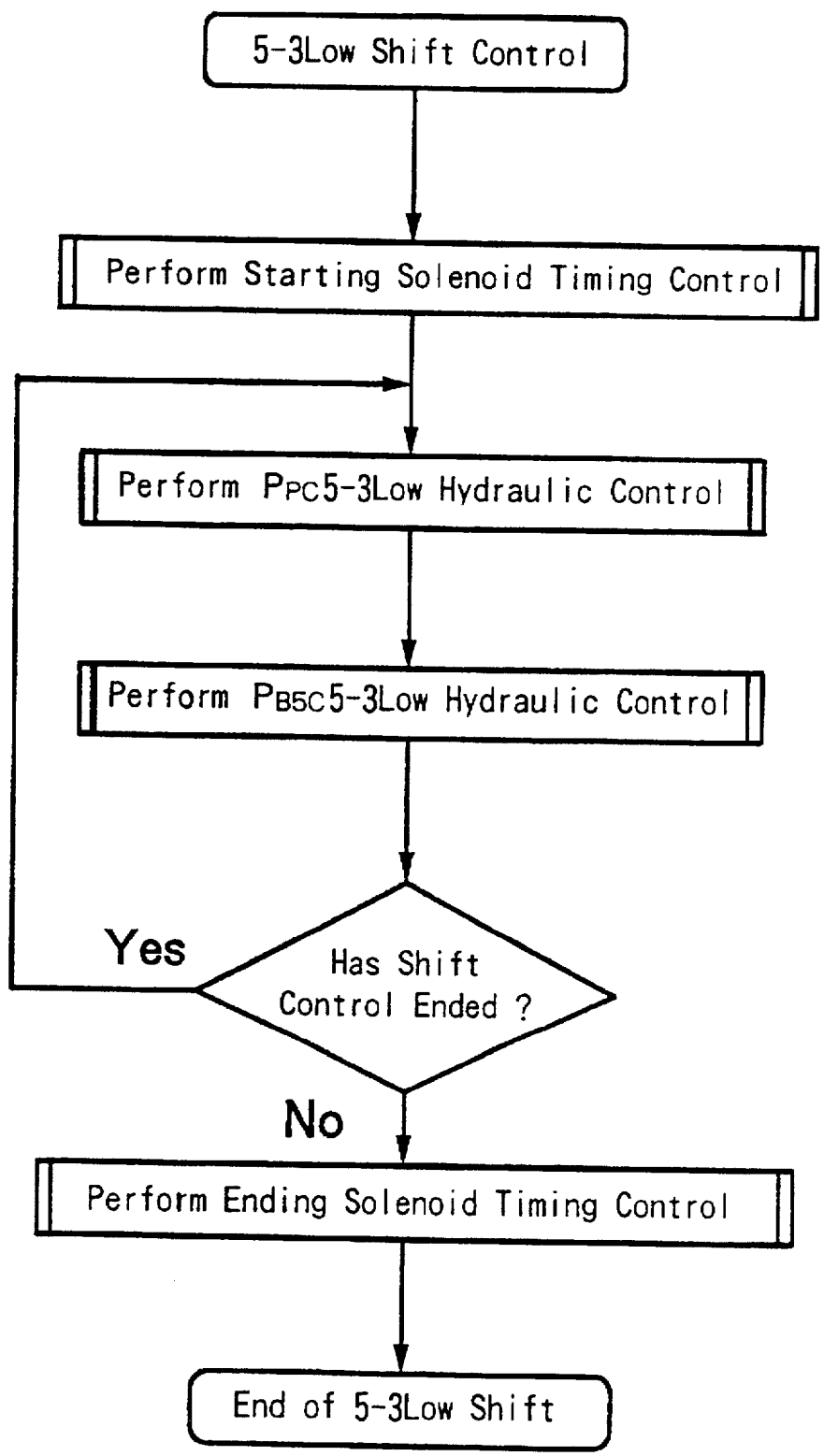
FIG. 13 is a flowchart of a routine for 5th-to-3rd low shift control.
Figure 14:
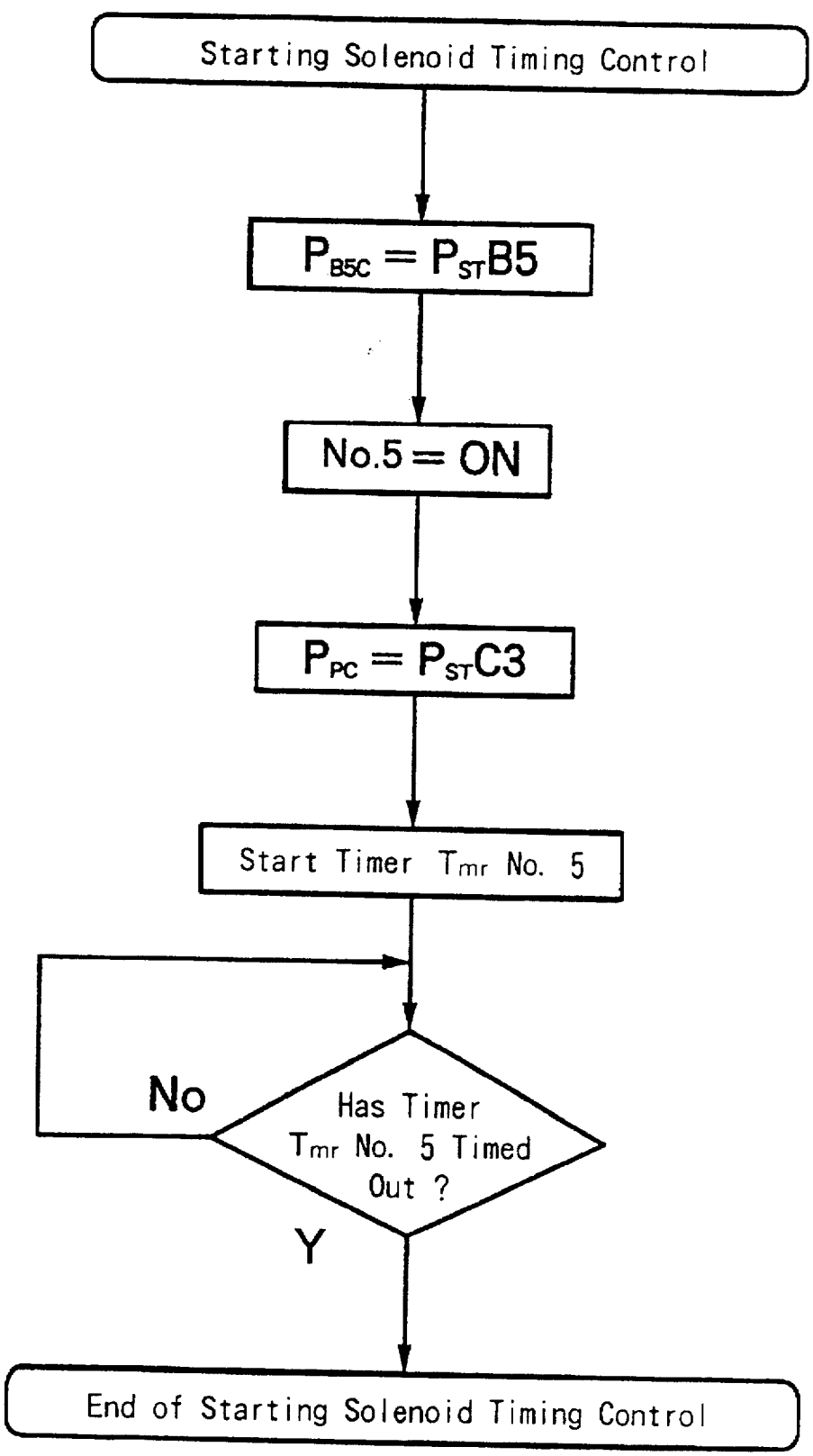
FIG. 14 is a flowchart of a subroutine for the solenoid timing control (step H3) at the start of the 5th-to-3rd low shift control.
Figure 15:
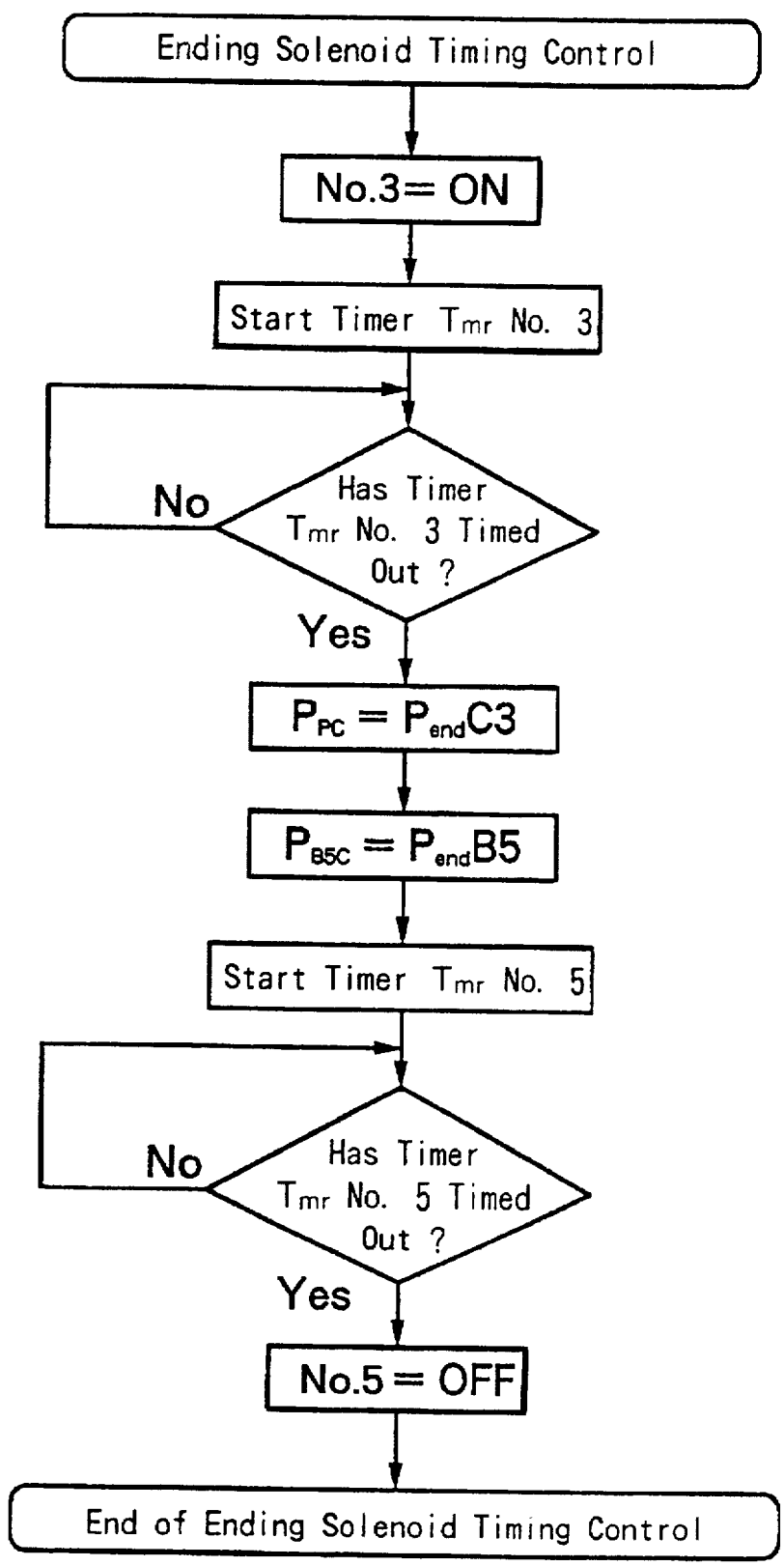
FIG. 15 is a flowchart of a subroutine for the solenoid timing control (step H7) at the end of the 5th-to-3rd low shift control.
Figure 16:
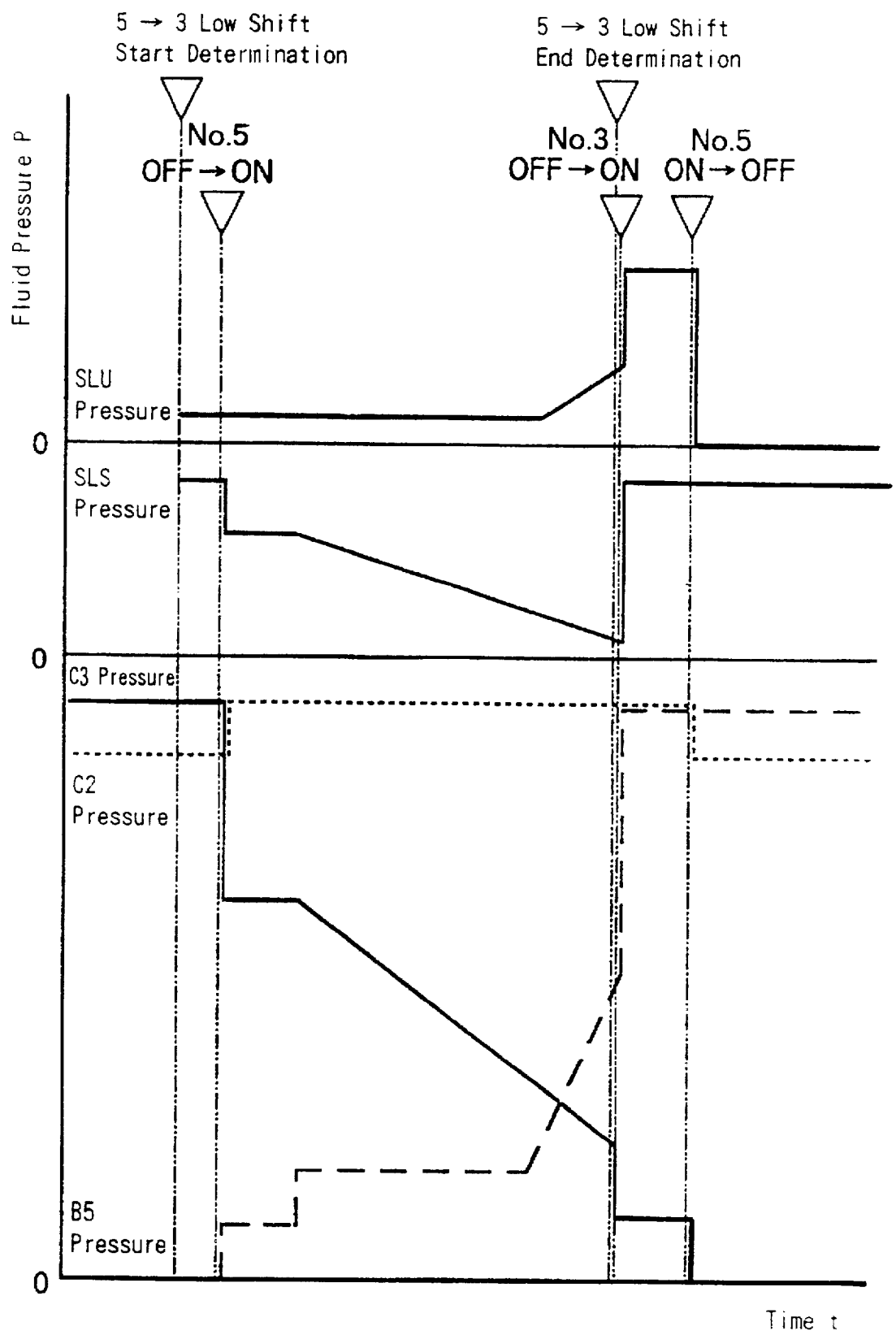
FIG. 16 is a timing chart for the 5th-to-3rd low shift control.
Figure 17:
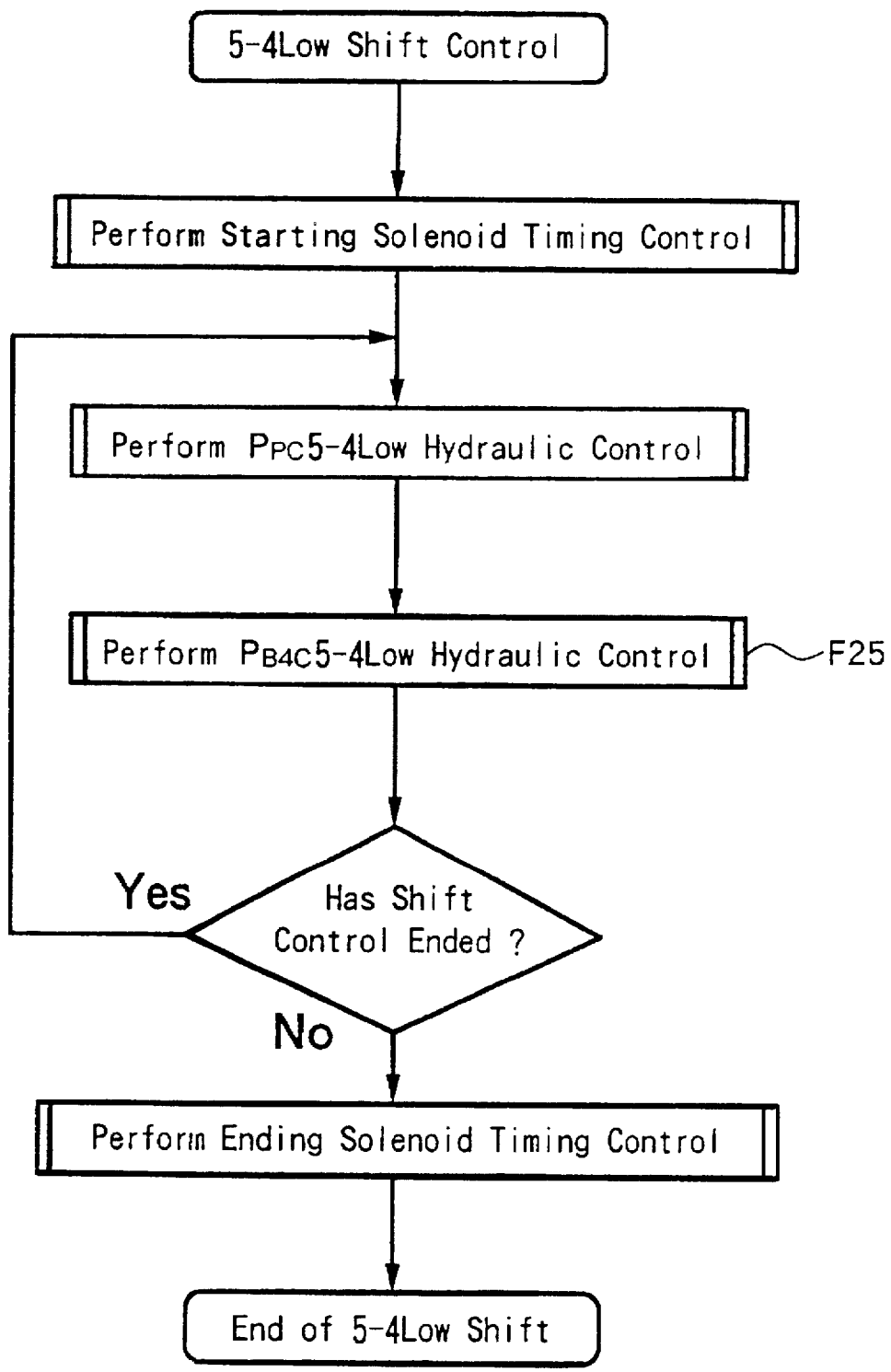
FIG. 17 is a flowchart of a routine for 5th-to-4th low shift control.
Figure 18:
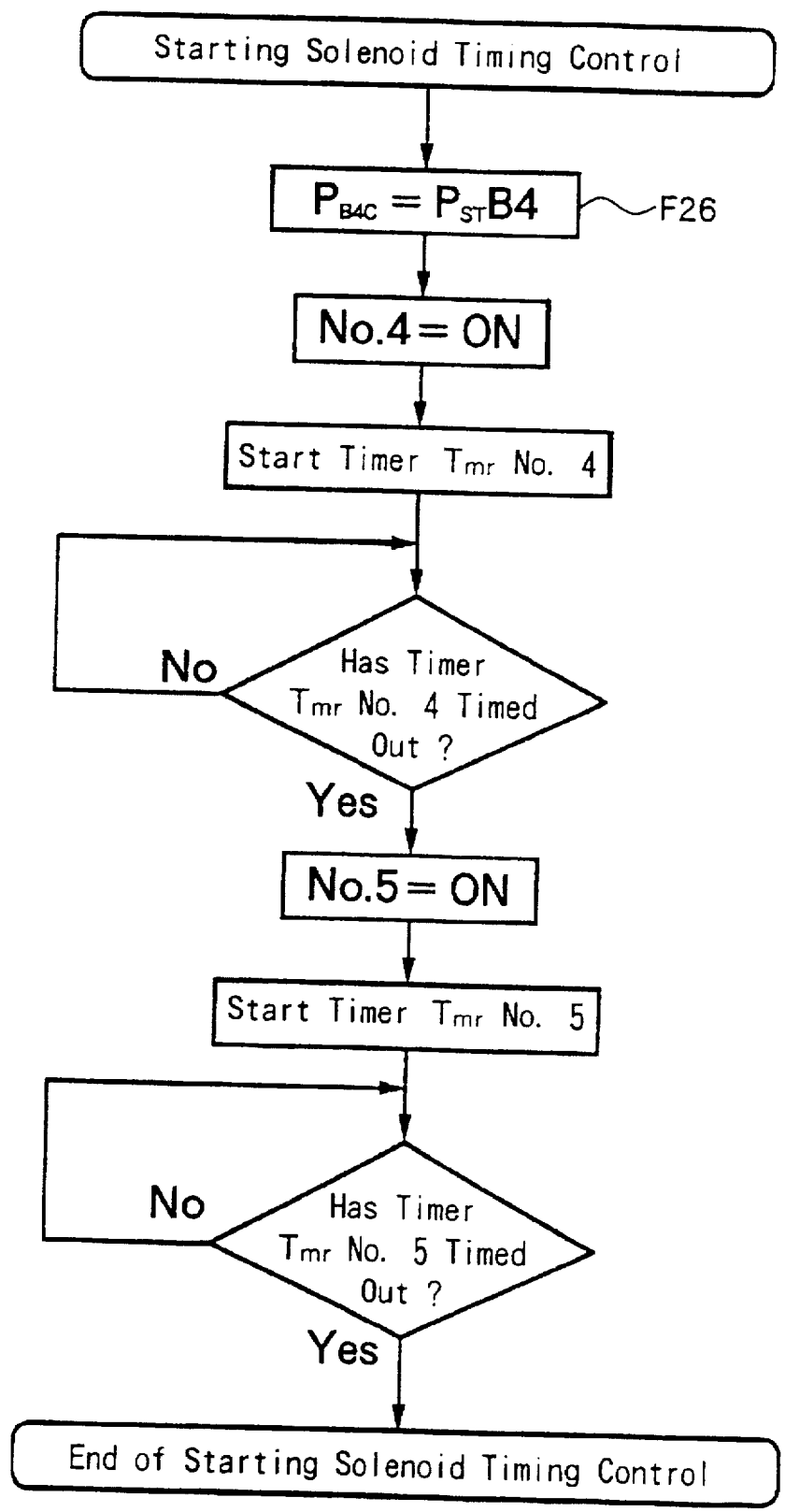
FIG. 18 is a flowchart of a subroutine for the solenoid timing control (step K-1) at the start of the 5th-to-4th low shift control.
Figure 19:
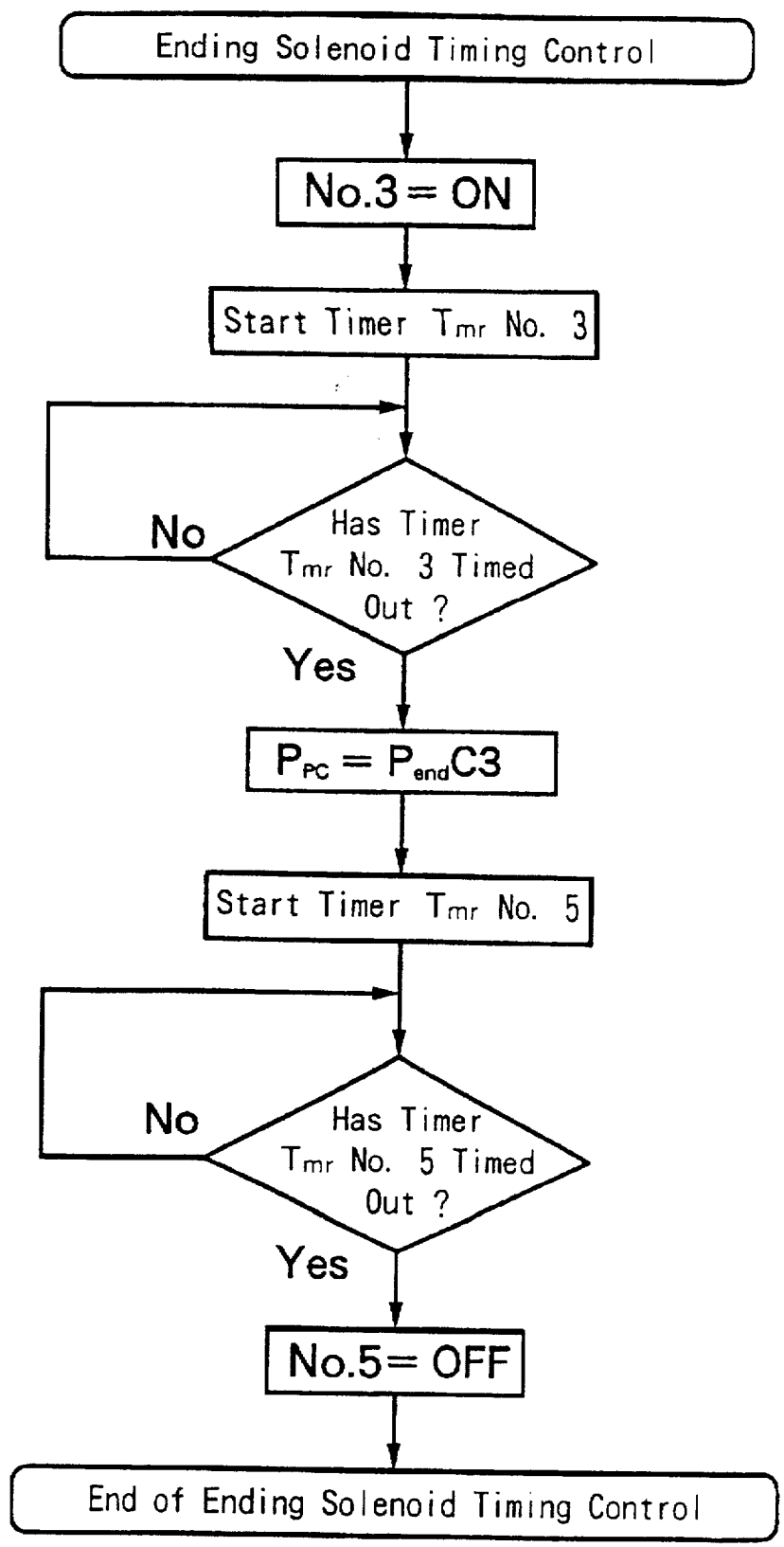
FIG. 19 is a flowchart of a subroutine for the solenoid timing control (step K-5) at the end of the 5th-to-4th low shift control.

Since in this hydraulic control circuit, the same shift pressure control valve 20 is used in common for all the hydraulic servos of the main shift mechanism and all the hydraulic servos of the auxiliary shift mechanism, the determination of the start of the 2nd-to-3rd shift by the control unit is immediately followed by the switching-on of the fifth solenoid valve No. 5 (F10) as shown in FIGS. 6 and 8. Then the normally closed valve No. 5 is released so that the pressure relay valve (fluid pressure changeover valve) 21 switches to the position indicated by the left-hand side half of its illustration shown in FIG. 3. In this position, the line pressure port 21b communicates with the main shift mechanism-side output port 21d and the regulated pressure port 21c communicates with the auxiliary shift mechanism-side output port 21f.

When this state is established, the control process goes on, as shown in FIG. 6, to start supplying the fourth brake hydraulic servo B-4 with the regulated fluid pressure from valve 20, responsive to operation of the linear solenoid valve SLS (F11), to start controlling the fifth brake hydraulic servo B-5 by using another linear solenoid valve SLU (F12), and to start measuring time following the switching-on of the solenoid valve No. 5 (F13). After a predetermined time has elapsed (F16), the solenoid valve No. 4 is switched on (F17), and then the starting solenoid timing control ends.

The control fluid pressure (SLS pressure) from the linear solenoid valve SLS is initially maintained at a relatively high constant level, and the control fluid pressure (SLU pressure) from the other linear solenoid valve SLU is also initially at a relatively high constant level, as indicated in FIG. 8. Before the shift control starts, that is, when the solenoid valve No. 5 is off, the pressure relay valve 21 is in the position indicated by the right-hand half of its illustration. In this position, the line pressure port 21e communicates with the auxiliary shift mechanism-side port 21f, but the line pressure is blocked by the U1 shift valve 26. Furthermore, the regulated pressure port 21c communicates with the main shift mechanism-side output port 21d, so that the regulated pressure is supplied to the second brake hydraulic servo B-2 as B2 pressure. The U1 shift valve 26 supplies the line pressure to the fifth brake hydraulic servo B-5 as B5 pressure.

When the solenoid valve No. 5 is switched on, the pressure relay valve 21 switches to the position indicated by the left half of its illustration, so that the line port 21b communicates with the main shift mechanism-side output port 21d to make the B2 pressure equal to the line pressure, and so that the regulated pressure port 21c communicates with the auxiliary shift mechanism-side output port 21f, while the U1 shift valve 26 is in the position indicated by the left half of its illustration. Thereby, although the control fluid pressure (SLS pressure) of the linear solenoid valve SLS is relatively high, the fluid pressure (B4 pressure) of the fourth brake hydraulic servo B-4 is not supplemented with additional fluid pressure since the regulated pressure is blocked by the U1 shift valve 26.

The control pressure (SLU pressure) from the other linear solenoid valve SLU is relatively high and is supplied to the solenoid relay valve 22, the ports 21g, 21h of the pressure relay valve 21, and the control chamber 35a of the B-5 control valve 35. By suitable control, the output port 35b of the B-5 control valve 35 outputs a suitably regulated pressure. This regulated pressure is blocked by the U1 shift valve 26, which is in the position indicated by the left half of its illustration.

When the solenoid valve No. 4 is switched on after a predetermined time has elapsed, the U1 shift valve 26 is switched to the position indicated by the right half of its illustration, thus establishing the third speed state. At the same time, the regulated pressure control of the linear solenoid valves SLU, SLS is performed. Then the regulated pressure from the output port 21f of the pressure relay valve 21 acts on the fourth brake hydraulic servo B-4 (B4 pressure), so that the B4 pressure is gradually increased by the control fluid pressure (SLS pressure) of the linear solenoid valve SLS. The release regulated pressure from the B-5 control valve 35 based on the linear solenoid pressure (SLU pressure) acts on the fifth brake hydraulic servo B-5 (B5 pressure), so that the B5 pressure gradually decreases. The fourth brake B4 is thereby smoothly engaged and the fifth brake B5 is released, thus establishing the third speed state.

Figure 7:
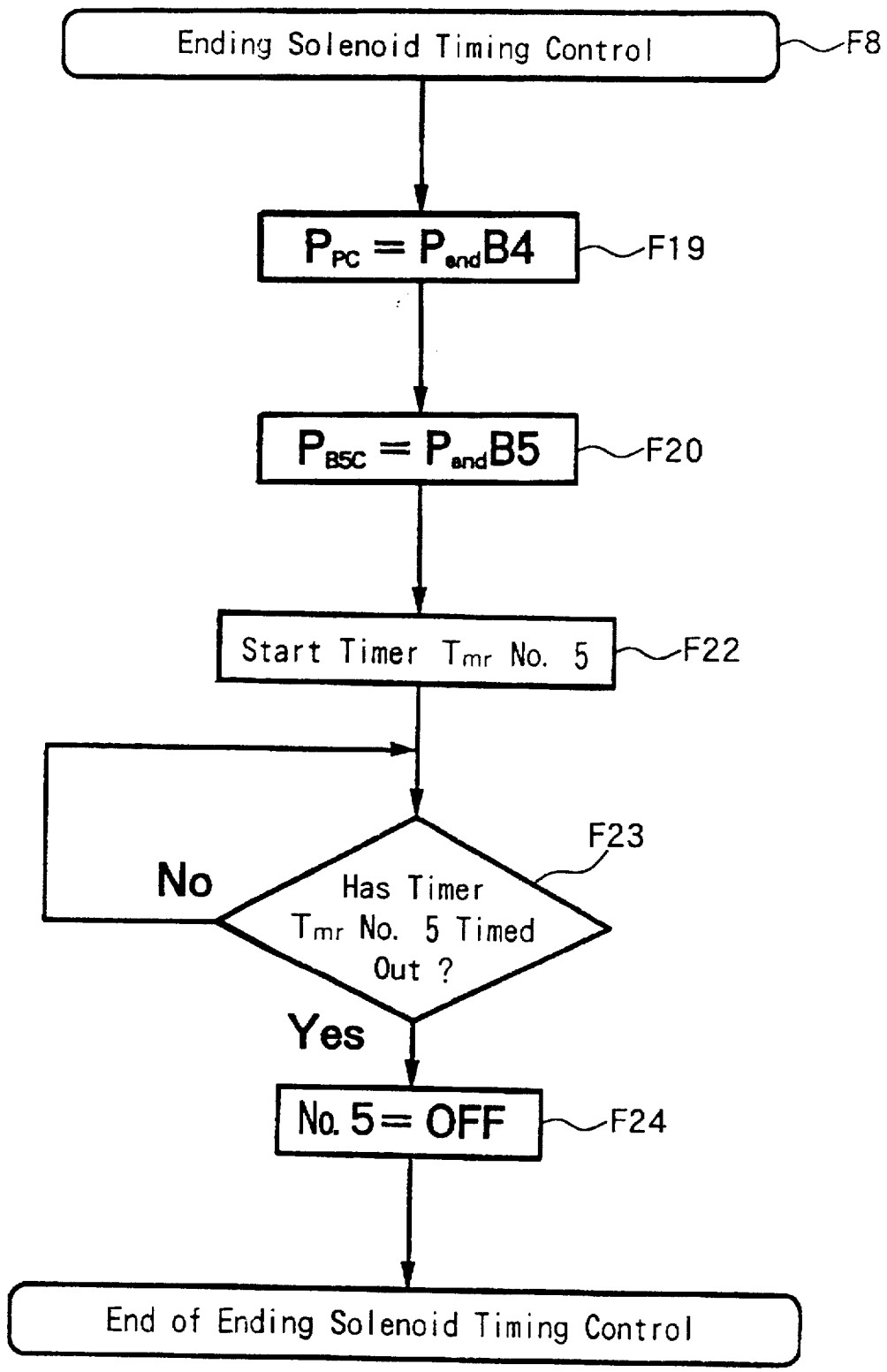
FIG. 7 is a flowchart of a subroutine for the solenoid timing control (step F8) at the end of the 2nd-to-3rd shift control.

The ending solenoid timing control is then performed as illustrated in FIG. 7. This control operation controls the discontinuation of the regulated pressure supply from the shift pressure control valve 20 to the fourth brake hydraulic servo B-4 (F19), and controls the discontinuation of the fluid pressure supply to the fifth brake hydraulic servo B-5 (F20). After a predetermined time has elapsed, as determined by a timer (F22, F23), the solenoid valve No. 5 is switched off (F24), and the 2nd-to-3rd shift is completed.

In this state, the B5 pressure based on the control fluid pressure SLU is low, for example, zero, but the B4 pressure based on the control fluid pressure SLS is sufficiently high so that the fourth brake B4 can be completely engaged. When the solenoid valve No. 5 is switched off, the pressure relay valve 21 switches to the position indicated by the right half of its illustration, so that the line pressure from the port 21e is fed to the auxiliary shift mechanism-side output port 21f and the regulated pressure from the port 21c is fed to the main shift mechanism-side output port 21g. The 32 pressure thereby becomes the regulated pressure based on the SLS pressure, and the B4 pressure becomes equal to the line pressure, so that the fourth brake hydraulic servo B-4 receives the line pressure to operate the brake B4 of the auxiliary shift mechanism 5, which is disposed downstream, in the path of torque transfer 5, from the main shift mechanism 2 currently in the second speed state. The fourth brake hydraulic servo B-4 thus reliably maintains the brake B4 in engagement.

The 3rd-to-2nd shift control will now be described with reference to FIGS. 9 to 12. The control unit determines whether or not to start the 3rd-to-2nd shift control on the basis of the detected throttle opening and the vehicle speed. At the outset, the automatic transmission is in the third speed state, where solenoid valve No. 5 is off and the solenoid valve No. 4 is on, so that the line pressure from the pressure relay valve 21 is supplied to the fourth brake hydraulic servo B-4 (B4 pressure) and the regulated fluid pressure based on the control fluid pressure SLS is supplied to the second brake hydraulic servo B-2 (B2 pressure). In addition, the zero pressure based on the SLU pressure is blocked by the solenoid relay valve 22, and the fifth brake hydraulic servo B-5 (B5 pressure) is drained through the solenoid relay valve 22.

When the solenoid valve No. 5 is switched on, the pressure relay valve 21 switches to the position indicated by the left half of its illustration, so that the line pressure from the port 21b is supplied to the B2 pressure through the output port 21d and the regulated pressure from the port 21c is supplied to the B4 pressure by way of the port 21f, the U1 shift valve 26, the U2 shift valve 27 and the B-4 check valve 40. In addition, the regulated pressure (SLS pressure) is supplied to the upper control fluid chamber 22a of the solenoid relay valve 22 so that the solenoid valve 22 switches to the position indicated by the right half of its illustration. In this state, by suitable control of the linear solenoid valves SLU and SLS based on signals from the control unit, the SLS pressure gradually decreases so that the B4 pressure gradually decreases. On the other hand, the SLU pressure gradually increases after remaining at a fixed level, so that the B5 pressure gradually increases. Thereby, the fourth brake B4 is gradually released and the engaging force of the fifth brake B5 gradually increases, to smoothly effect the 3rd-to-2nd shift by the engagement changeover.

After it is determined that the 3rd-to-2nd shift has been completed, the solenoid valve No. 4 is switched off so that the U1 shift valve 26 switches to the position indicated by the left half of its illustration. The regulated fluid pressure to the B-5 control valve 35 based on the control fluid pressure SLU is discontinued, so that the SLU pressure increases and the B5 pressure becomes the line pressure. In addition, the regulated fluid pressure from the shift pressure control valve 20 based on the control fluid pressure SLS is discontinued, so that the SLS pressure increases and the B4 pressure is drained.

After the lapse of a predetermined time, as indicated by a timer, the solenoid valve No. 5 is switched off so that the pressure relay valve 21 switches to the position indicated by the right half of its illustration. In this state, the line pressure conducted by way of the input port 21e and the output port 21f is blocked by the U1 shift valve 26, and the regulated fluid pressure based on the control fluid pressure SLS is added to the B2 pressure through the port 21c and the output port 21d, and the B-4 pressure is maintained in the drained state.

As in the 3rd-to-2nd shift, in any shift where the release pressure of the friction engagement element (B4) of the auxiliary shift mechanism 5 is to be controlled on the basis of the control fluid pressure SLS, the pressure relay valve 21 is controlled so that the regulated pressure is raised for a predetermined time on the basis of the SLS pressure, while the auxiliary shift mechanism-side shift valve 26 or 27 is switched so that feed of the regulated pressure is discontinued. Subsequently, when the regulated pressure based on the SLS pressure becomes a high pressure, the pressure relay valve 21 switches its position. Thus, a high pressure is applied to a predetermined friction engagement element of the main speed shift mechanism that had been receiving the line pressure, so as to prevent low pressure on that friction engagement element.

Shifts between the 5th and 4th speeds, which are most frequently performed in automatic transmissions, are performed by engaging or releasing the direct clutch C2 of the main shift mechanism 2 while maintaining the auxiliary shift mechanism 5 in the same state. In control of these shifts, the solenoid valve No. 5 remains off, and the pressure relay valve 21 is maintained in the position indicated by the left half of its illustration. The pressure relay valve 21 thus remains in the aforementioned state, regardless of whether the shift is a 4th-to-5th shift or a 5th-to-4th shift, and regardless of whether the 4th or 5th speed is maintained. The time lag is thus reduced.

During the shift from the 5th speed to the 4th speed, the release of the direct clutch C2 of the main shift mechanism 2 is controlled, and the third clutch C3 of the auxiliary shift mechanism 5 is maintained in engagement and the second brake B2 of the main shift mechanism 2 is also maintained in engagement. In the 5th speed, the M2 shift valve 25 is in the position indicated by the left half of its illustration, where the input port 25a communicates with the output port 25b so that the fluid pressure from the shift pressure control valve 20 is supplied to the hydraulic servo C-2 by way of the ports 21c, 21d of the relay valve 21 and the M1 shift valve 23. In the 4th speed state, the M2 shift valve 25 is switched to the position indicated by the right half of its illustration, where the output port 25b communicates with the drain port. As stated above, it is necessary to continue supplying the line pressure to the second brake hydraulic servo B-2 in this state. However, the switching of the M2 shift valve 25 disconnects communication between the input port 25c and the output port 25d, so that the line pressure supply from the fluid passage e to the hydraulic servo B-2 is blocked. At the same time, however, the switching of the M2 shift valve 25 establishes communication between the regulated pressure input port 25a and the output port 25d, so that the regulated fluid pressure from the shift pressure control valve 20 is supplied to the hydraulic servo B-2.

In order to compensate for the lower pressure (regulated pressure) received by the hydraulic servo B-2 in the above-described manner, the two-way B-2 check valve 39 is provided. One input port 39a of the check valve 39 is connected to a fluid passage extending from the output port 25d to receive the regulated (low) pressure from the shift pressure control valve 20, and the other input port 39b is connected to a fluid passage extending from the output port 26b of the U1 shift valve 26. The output port 39c of the check valve 39 is connected to the hydraulic servo B-2.

Accordingly, when the line pressure supply to the input port 39a of the B-2 check valve 39 is discontinued, the output port 26b of the U1 shift valve 26 is supplied with the line pressure from the output port 21f of the pressure relay valve 21, is further conducted to the third clutch hydraulic servo C-3 through the ports 27a, 27b of the U2 shift valve 27, and is thereby received at the other input port 39b of the B-2 check valve 39. Therefore, even if the M2 shift valve 25 is switched, the line pressure, serving as the C-3 engaging pressure, is supplied to the hydraulic servo B-2 through the other input port 39b of the B-2 check valve 39, so that the second brake B2 is maintained in engagement.

The 5th-to-3rd low (2.5th) shift control will now be described with reference to FIGS. 13–16.

In the 5th speed state, the main shift mechanism 2 is locked up by the forward clutch C1 and the direct clutch C2 being engaged, and the auxiliary shift mechanism 5 is also locked up by the UD direct clutch C3 being engaged. For the 3rd low speed, the main shift mechanism 2 is maintained in the locked-up state, but the auxiliary shift mechanism 5 is shifted to the first speed state, where the fifth brake B5 is engaged. Thus, the 5th-to-3rd low shift control maintains the main shift mechanism 2 in its current (5th speed) state, and controls the changeover engagement control wherein the auxiliary shift mechanism 5 releases the UD clutch C3 and engages the fifth brake B5.

If a driver depresses the accelerator pedal for a quick acceleration, for example to pass another vehicle, during steady travel in 5th speed, the control unit determines that the 5th-to-3rd low shift control is to be started. In the 5th speed state at this moment of determination, the solenoid valve No. 5 is off, so that the regulated fluid pressure from the shift pressure control valve 20, based on the control fluid pressure SLS, is supplied to the direct clutch hydraulic servo C-2 (C2 pressure) through the port 21c and the output port 21d. In this manner the line pressure is supplied to the UD direct clutch hydraulic servo C-3 (C3 pressure) through the port 21e, the output port 21f, the U1 shift valve 26 set in the position indicated by the right half of its illustration, and the U2 shift valve 27 set in the position indicated by the right half of its illustration. Further, the pressure in the fifth brake hydraulic servo B-5 (B5 pressure) is drained through the solenoid relay valve 22 set in the position indicated by the left half of its illustration.

When the solenoid valve No. 5 is switched on in this state, the pressure relay valve 21 switches to the position indicated by the left half of its illustration, so that the regulated pressure based on the control pressure SLS is applied through the U1 shift valve 26 to the upper control fluid chamber 22a of the solenoid relay valve 22 to switch it to the position indicated by the right half of its illustration. As a result, the control fluid pressure SLU from the linear solenoid valve SLU is applied to the control fluid chamber 35a of the B-5 control valve 35 for suitable pressure control of the valve, and the regulated fluid pressure is then supplied as the B5 pressure through the U1 shift valve 26 set in the position indicated by the right half of its illustration, and the solenoid relay valve 27 set in the position indicated by the right half of its illustration. In addition, since the line pressure port 21b is now in communication with the output port 21d, the C2 pressure becomes the line pressure.

Furthermore, since the regulated pressure port 21c is in communication with the output port 21f, the regulated pressure from the shift pressure control valve 20 based on the control fluid pressure SLS acts as the C3 pressure, conducted through the U1 shift valve 26 set in the position indicated by the right half of its illustration, and through the U2 shift valve 27 set in the position indicated by the right half of its illustration.

Then, for release pressure regulation, the control fluid pressure SLS gradually decreases the C3 pressure. On the other hand, the control fluid pressure SLU gradually increases after remaining at a fixed low level, so that the B5 pressure gradually increases after remaining at a fixed low level. The UD direct clutch C3 is thereby gradually released, and the fifth brake B5 receives gradually increasing engagement pressure after the clutch plate has been maintained in contact for a predetermined time. The 5th-to-3rd low shift is thus effected smoothly. After the completion of this shift is determined, the solenoid valve No. 3 is immediately switched on. Thereby, the U2 shift valve 27 switches from the position indicated by the right half to the position indicated by the left half of its illustration, to drain the C3 pressure. In addition, since the line pressure supply to the upper control fluid chamber 26a of the U1 shift valve 26 is blocked, the valve 26 switches to the position indicated by the left half of its illustration so that the line pressure acts as the B5 pressure. The fifth brake B5 and the direct clutch C2 are thereby reliably engaged and the UD direct clutch C3 is reliably released, achieving the 3rd low speed state without fail.

After a predetermined time has elapsed as determined by a timer, the solenoid valve No. 5 is switched off, so that the pressure relay valve 21 thereby switches to the position indicated by the right half of its illustration. The regulated pressure based on the control fluid pressure SLS is applied as the C2 pressure through the port 21c and the output port 21d. Although the line pressure supply through the port 21e and the output port 21f is blocked by the U1 shift valve 26, the line pressure is applied as the B5 pressure as described above. Thus the 3rd low speed state is reliably maintained.

Figure 20:
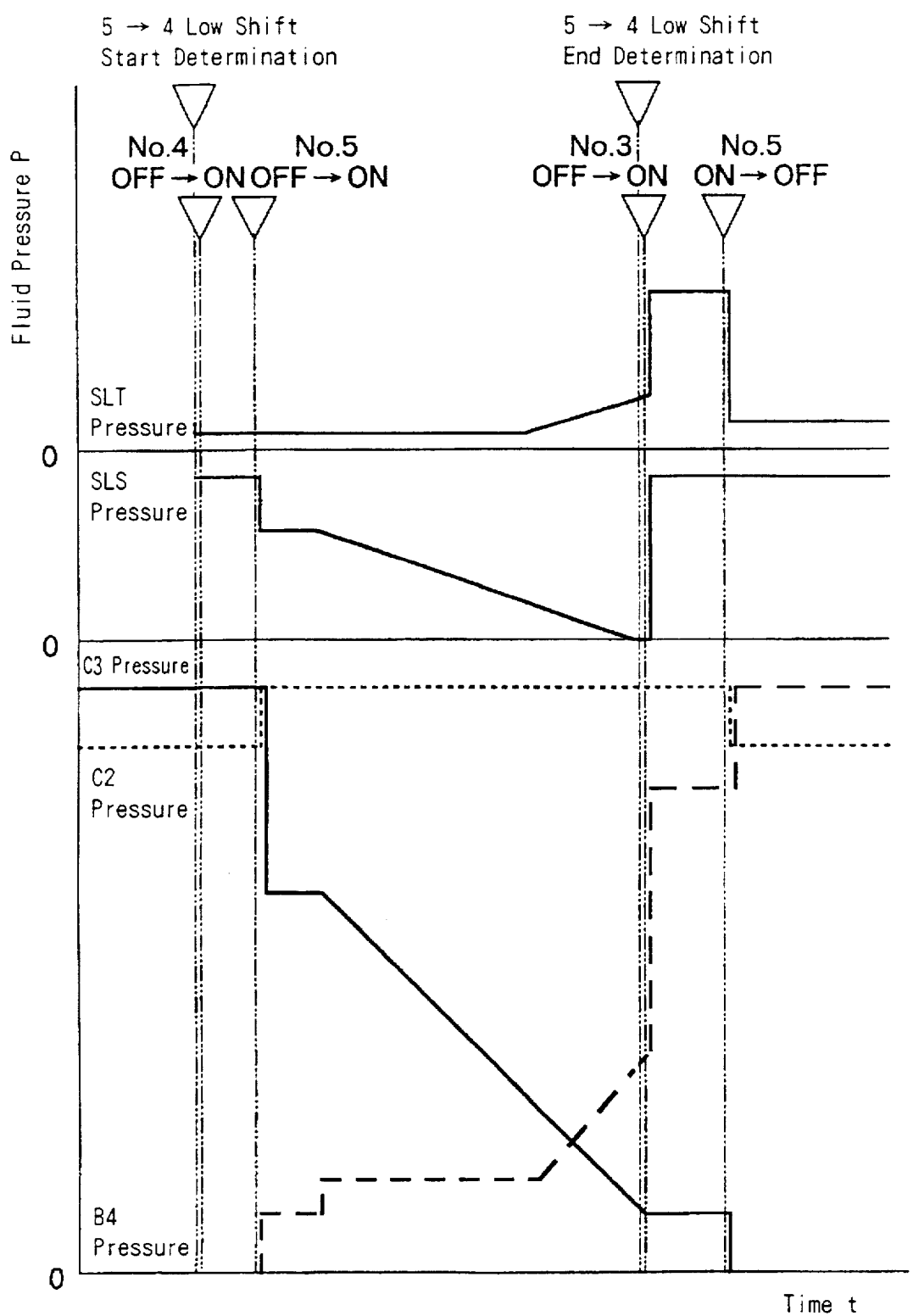
FIG. 20 is a timing chart for the 5th-to-4th low shift control.

The 5th-to-4th low shift control will now be described. The routine for this control is substantially the same as that described above, except for the $P_{B4C}$5-4 low hydraulic control step (F25) and the $P_{B4C}=P_{STT}$B4 step (F26) control the B4 pressure based on the linear solenoid valve SLT. The following description will be made with reference to the timing chart of FIG. 20.

During the 5th-to-4th low shift, the main shift mechanism 2 remains locked up, and the auxiliary shift mechanism 5 shifts to the second speed state by releasing the UD direct clutch C3 and engaging the fourth brake B4. At the time of the determination of the start of the 5th-to-4th low shift, the regulated fluid pressure based on the control fluid pressure SLS acts as the C2 pressure, and the line pressure acts as the C3 pressure, as described above. In addition, the pressure (B4 pressure) of the fourth brake hydraulic servo B-4 is drained through the 3-4 timing valve 36.

When the solenoid valve No. 4 is switched on, the control fluid pressure is supplied to the lower control fluid chamber 22b of the solenoid relay valve 22 through the U2 shift valve 27 set in the position indicated by the right half of its illustration, to switch the solenoid relay valve 22 to the position indicated by the left half of its illustration. After a predetermined time has elapsed, as determined by a timer, the solenoid valve No. 5 is switched on to switch the pressure relay valve 21 to the position indicated by the left half of its illustration. In this state, the regulated pressure based on the control pressure SLS acts as the C3 pressure, conducted through the U1 shift valve 26 set in the position indicated by the right half of its illustration, and the U2 shift valve 27 set in the position indicated by the right half of its illustration. The line pressure acts as the C2 pressure, conducted through the ports 21b, 21d. Since the regulated pressure, lower than the line pressure, is applied as the C3 pressure and acts on the lower control fluid chamber 36a of the 3-4 timing valve 36, the valve 36 is switched to the position indicated by the right half of its illustration, by the line pressure acting on its upper control fluid chamber.

The throttle linear solenoid valve SLT is suitably controlled by a signal from the control unit, so that the control fluid pressure (SLT pressure) from its output port acts on the control fluid chamber 33a of the B-4 control valve 33 to control the pressure regulation operation of the valve 33. The regulated fluid pressure from the valve 33 is supplied to the B4 pressure through the U1 shift valve 26 set in the position indicated by the right half of its illustration, the B-4 check valve 40, and the 3-4 timing valve 36 set in the position indicated by the right half of its illustration.

The control fluid pressure SLS is gradually decreased so that the C3 pressure gradually decreases, and the control fluid pressure SLT is gradually increased after being maintained at a fixed low pressure so that the B-4 pressure gradually increases after remaining at a fixed low pressure. The UD direct clutch C3 is thereby gradually released and the engaging force of the fourth brake B4 is smoothly increased after the brake B4 has come into a state of contact.

When the control unit determines that the 5th-to-4th low shift is completed, the control unit switches on the solenoid valve No. 3. The U2 shift valve 27 thereby switches to the position indicated by the left half of its illustration, so that the control fluid pressure from the solenoid valve No. 4 is switched from the lower control fluid chamber 22b of the solenoid relay valve 22 to the upper control fluid chamber 26a of the U1 shift valve 26. Thus, the solenoid relay valve 22 is switched to the position indicated by the right half of its illustration, and the U1 shift valve 26 is maintained in the position indicated by the right half of its illustration.

In this state, the regulated pressure from the output port 21f of the pressure relay valve 21, based on the control fluid pressure SLS, is conducted through the U1 shift valve 26 set in the position indicated by the right half of its illustration, and the U2 shift valve 27 set in the position indicated by the left half of its illustration, and the regulated fluid pressure is blocked by the 3-4 check valve 40. The regulated pressure based on the control fluid pressure SLT is applied as the 24 pressure, through the B-4 check valve 40 and the 3-4 timing valve 36. The 34 pressure increases with increase of the control fluid pressure SLT. The C3 pressure is drained through the U2 shift valve 27. After a predetermined time has elapsed, as determined by a timer, the solenoid valve No. 5 is switched off. The pressure relay valve 21 thereby switches to the position indicated by the right half of its illustration, so that the line pressure from the port 21e is output from the output port 21f and applied as the 34 pressure, and the fluid pressure based on the control fluid pressure SLS is applied as the C2 pressure through the ports 21c, 21d.

The aforementioned hydraulic control circuit U comprises a first fluid passage a for supplying fluid pressure from the pressure control valve 20 to the pressure relay valve 21, second fluid passages b, c for supplying fluid pressure from the pressure relay valve 21 to the first shift mechanism-side shift valves 23, 25 and to the second shift mechanism-side shift valves 26, 27, and third fluid passages d1, d3 extending from the first fluid passage a to the second fluid passages b, c, rather than via the pressure relay valve 21. The third fluid passages d1, d3 are provided with one-way check valves 45, 46 for connecting first fluid passage a to the second fluid passages b, c, respectively, when the fluid pressure in the second fluid passages b, c becomes lower than the fluid pressure in the first fluid passage a.

It is normally necessary to provide sufficiently large torque capacity for predetermined friction engagement elements after the engagement control of the friction engagement elements using pressure control valves. The above-described hydraulic control circuit U is able to constantly provide a sufficiently high torque capacity by preventing closure of either of the second fluid passages b, c during the switchover operation of the fluid pressure changeover valve, which would otherwise result in low pressure during the pressure changeover.

The hydraulic control circuit U is further provided with the M1 shift valve 23 for achieving a low speed (for example, the first or second speed) of the main shift mechanism 2, and the second shift mechanism-side shift valves 26, 27 for achieving a predetermined speed (for example, the second and third speeds, or the third speed) of the auxiliary shift mechanism 5, and the solenoid valves No. 3 and No. 4 for the changeover control of the second shift mechanism-side shift valves. The solenoid valves No. 3 and No. 4 are respectively disposed in the fluid passages e, f connecting the fluid pressure source to the second shift mechanism-side shift valves. The M1 shift valve 23 is disposed in the fluid passages e, f, and closes the fluid passages for the low speed of the main shift mechanism.

Normally, during the low speed of the main shift mechanism 2, the friction engagement elements engaged for a higher speed of the auxiliary shift mechanism receive increased loads because the main shift mechanism 2 inputs increased torque to the auxiliary shift mechanism. However, the above-described hydraulic control circuit U prevents the auxiliary shift mechanism 5 from shifting to a higher speed during a low speed of the main shift mechanism, by discontinuing the source pressure to the solenoid valves No. 3 and No. 4, which solenoid valves change the position of the shift valves 26, 27 for controlling the shift of the auxiliary shift mechanism (for example, to the second and third speed, or to the third speed). The hydraulic control circuit U thus increases the service life of the high-speed friction engagement elements of the auxiliary shift mechanism.

The M1 shift valve 23 in the fluid passages e, f is disposed between the fluid pressure source and the solenoid valves No. 3 and No. 4.

In an arrangement in which the first shift mechanism-side shift valves are disposed in fluid passages between the solenoid valves No. 3, No. 4 and the second shift mechanism-side shift valves, the flow loss would become large if the connection between the fluid pressure source and the drain fluid passage was established by the solenoid valve. However, this hydraulic control circuit U disconnects the fluid pressure source from the drain fluid passage, using the first shift mechanism-side shift valves, to reduce flow loss when either of the solenoid valves is in the position for the connection between the fluid pressure source and the drain fluid passage.

In the hydraulic control circuit U, a fluid passage i connects to the line pressure port 21e of the pressure relay valve 21 to the ports 31a, 31b of the manual valve 31 through the DR check valve 37.

Accordingly, if the manual valve 31 is set in the P (parking) range, the ports 31a, 31b are drained, so that the line pressure fluid passage i is opened. For the P range, it is necessary to release the various hydraulic servos. However, in some cases, the shift pressure control valve 20 is maintained in a low pressure state due to the relationship between its spool and spring, and a low pressure is supplied to the hydraulic servos through the ports 21c, 21d of the pressure relay valve 21 set in the position indicated by the right half of its illustration, the fluid passage b, and the M1 and M2 shift valves 23, 25. However, since the regulated pressure fluid passage a, connecting through the ports 21c and 21d of the pressure relay valve 21 to the (fifth) fluid passage b connecting to the hydraulic servos, has a larger fluid pressure than the (sixth) fluid passage c, the check valve 45 opens to connect the regulated pressure fluid passage a to the fluid passage c via the (seventh) fluid passage d2. The fluid passage c is connected to the line pressure (fourth) fluid passage i, which is open, through the ports 21f, 21e of the pressure relay valve 21.

Therefore, if the fluid pressure in the fifth fluid passage b connecting to the regulated fluid passage a is higher than the fluid pressure in the sixth fluid passage c connecting to the open fourth fluid passage i, the check valve 45 opens so that the fluid passage b connecting to the various hydraulic servos is drained through the fluid passage i. This embodiment thus ensures the drainage of the hydraulic servos even if a low pressure occurs in the shift pressure control valve 20.

Although in the above description, the pressure relay valve 21 is set in the position indicated by the right half of its illustration, by the solenoid valve No. 5 being off in the P range, the drainage of the hydraulic servo will also be ensured if the pressure relay valve 21 is in the position indicated by the left half of its illustration. More specifically, if a low pressure from the regulated pressure fluid passage, as regulated by the pressure control valve 20, is supplied to the hydraulic servos through the ports 21c, 21f of the relay valve 21 and the U1 and U2 shift valves 26, 27, the check valve 46 opens since the regulated pressure fluid passage a has a higher pressure than the (sixth) fluid passage b. Therefore, the regulated pressure fluid passage a connecting to the (fifth) fluid passage c through the ports 21f, 21c becomes connected to the (sixth) fluid passage b through the (seventh) fluid passage d1 provided with the check valve 46. The fluid passage b is connected to the line pressure (fourth) fluid passage i, which is open, through the ports 21d, 21b.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic control apparatus for an automatic transmission, comprising:
   a first shift mechanism and a second shift mechanism each of which has a plurality of friction engagement elements; and
   a hydraulic control circuit for achieving a plurality of speeds by selectively supplying fluid pressure to and discharging fluid pressure from hydraulic servo units which operate said plurality of friction engagement elements, the hydraulic control circuit comprising:

a first hydraulic servo for controlling a first friction engagement element in the first shift mechanism;

a first shift valve for switching between supply and discharge of fluid pressure to/from said first hydraulic servo, responsive to various speed signals;

a second hydraulic servo for controlling a second friction engagement element in the second shift mechanism;

a second shift valve for switching between supply and discharge of fluid pressure to/from the second hydraulic servo, in accordance with said speed signals;

a fluid pressure source for generating a line pressure;

a pressure regulating valve for regulating the line pressure from the fluid pressure source to provide a regulated pressure; and a fluid pressure changeover valve for selectively supplying the line pressure or the regulated pressure to the first shift valve and to the second shift valve.

2. A hydraulic control apparatus for an automatic transmission according to claim 1, wherein said fluid pressure changeover valve comprises:

a regulated pressure input port for receiving the regulated pressure, a line pressure input port for receiving the line pressure, a first output port for output of the regulated pressure or the line pressure to the first shift valve, and a second output port for output of the regulated pressure or the line pressure to the second shift valve; and wherein said fluid pressure changeover valve is switchable between a first position wherein the regulated pressure input port and the first output port communicate with each other and the line pressure input port and the second output port communicate with each other, and a second position wherein the regulated pressure input port and the second output port communicate with each other and the line pressure input port and the first output port communicate with each other.

3. A hydraulic control apparatus for an automatic transmission according to claim 1, wherein the first shift mechanism receives, as input, torque from an engine and is shiftable between a plurality of reduced output speeds, and the second shift mechanism receives, as input, output from the first shift mechanism; and wherein the second shift valve supplies pressure to said second hydraulic servo for engagement of said second friction engagement element with the second shift mechanism at a predetermined speed; and wherein, when the second shift mechanism completes a shift to the predetermined speed, the fluid pressure changeover valve switches from a second position wherein the regulated pressure is supplied to the second shift valve, to a first position wherein the line pressure is supplied to the second shift valve.

4. A hydraulic control apparatus for an automatic transmission according to claim 2, wherein said first shift mechanism receives, as input, torque from an engine and is shiftable between a plurality of reduced output speeds, and said second shift mechanism receives, as input, output from said first shift mechanism;

wherein said second shift valve supplies the line pressure to said second hydraulic servo for engagement of said second friction engagement element with the second shift mechanism at a predetermined speed; and wherein, when said second shift mechanism completes a shift to the predetermined speed, said fluid pressure changeover valve switches from the second position to the first position.

5. A hydraulic control apparatus for an automatic transmission according to claim 1, wherein said first shift mechanism achieves the highest speed and the speed next to the highest speed by engaging or releasing a predetermined friction engagement element; and wherein after a shift to the highest speed is completed, the fluid pressure changeover valve is held in the same position as assumed during the shift to the highest speed.

6. A hydraulic control apparatus for an automatic transmission according to claim 2, wherein said first shift mechanism achieves the highest speed and the speed next to the highest speed by engaging or releasing a predetermined friction engagement element; and wherein after a shift to the highest speed is completed, the fluid pressure changeover valve is held in the same position as assumed during the shift to the highest speed.

7. A hydraulic control apparatus for an automatic transmission according to claim 1, wherein when a shift is to be effected by releasing said second friction engagement element while maintaining engagement of said first friction engagement element:

said first shift valve maintains said first friction engagement element in engagement by supplying fluid pressure to said first hydraulic servo during the shift, said second shift valve switches from a position supplying the regulated fluid pressure from the pressure regulating valve to said second hydraulic servo to a position where the regulated fluid pressure is not supplied to said second hydraulic servo, and said fluid pressure changeover valve supplies said first shift valve with the regulated fluid pressure from said pressure regulating valve raised over a second predetermined period of time which begins with expiration of a first predetermined period of time following the discontinuation of supply of the regulated fluid pressure from said second shift valve to said second hydraulic servo at the time of completion of the shift.

8. A hydraulic control apparatus for an automatic transmission according to claim 2, wherein when a shift is to be effected by releasing said second friction engagement element while maintaining engagement of said first friction engagement element:

said first shift valve maintains said first friction engagement element in engagement by supplying fluid pressure to said first hydraulic servo during the shift, said second shift valve switches from a position supplying the regulated fluid pressure from the pressure regulating valve to said second hydraulic servo to a position where the regulated fluid pressure is not supplied to said second hydraulic servo, and said fluid pressure changeover valve supplies said first shift valve with the regulated fluid pressure from said pressure regulating valve raised over a second predetermined period of time which begins with expiration of a first predetermined period of time following the discontinuation of supply of the regulated fluid pressure from said second shift valve to said second hydraulic servo at the time of completion of the shift.

9. A hydraulic control apparatus for an automatic transmission according to claim 1, further comprising:
- a first fluid passage for supplying the regulated fluid pressure from said pressure regulating valve to said fluid pressure changeover valve;
- a second fluid passage for supplying fluid pressure from said fluid pressure changeover valve to at least one of said first and second shift valves; and
- a third fluid passage that connects said first fluid passage to said second fluid passage, by-passing said fluid pressure changeover valve, said third fluid passage being provided with connecting means for opening said third fluid passage to connect said first fluid passage with said second fluid passage when the fluid pressure in said second fluid passage becomes less than the fluid pressure in said first fluid passage.

10. A hydraulic control apparatus for an automatic transmission according to claim 2, further comprising:
- a first fluid passage for supplying the regulated fluid pressure from said pressure regulating valve to said fluid pressure changeover valve;
- a second fluid passage for supplying fluid pressure from said fluid pressure changeover valve to at least one of said first and second shift valves; and
- a third fluid passage that connects said first fluid passage to said second fluid passage, by-passing said fluid pressure changeover valve, said third fluid passage being provided with connecting means for opening said third fluid passage to connect said first fluid passage with said second fluid passage when the fluid pressure in said second fluid passage becomes less than the fluid pressure in said first fluid passage.

11. A hydraulic control apparatus for an automatic transmission according to claim 1, further comprising:
- a fluid passage connecting said second shift valve with said fluid pressure source;
- a third shift valve, located within said fluid passage, for achieving a low speed output of said first shift mechanism by closing said fluid passage;
- a fourth shift valve for achieving a predetermined speed output of said second shift mechanism; and
- a solenoid valve for controlling switching of said second shift valve, said solenoid valve being disposed in said fluid passage.

12. A hydraulic control apparatus for an automatic transmission according to claim 2, further comprising:
- a fluid passage connecting said second shift valve with said fluid pressure source;
- a third shift valve, located within said fluid passage, for achieving a low speed output of said first shift mechanism by closing said fluid passage;
- a fourth shift valve for achieving a predetermined speed output of said second shift mechanism; and
- a solenoid valve for controlling switching of said second shift valve, said solenoid valve being disposed in said fluid passage.

13. A hydraulic control apparatus for an automatic transmission according to claim 11 wherein said third shift valve is located in said fluid passage between said fluid pressure source and said solenoid valve.

14. A hydraulic control apparatus for an automatic transmission according to claim 12 wherein said third shift valve is located in said fluid passage between said fluid pressure source and said solenoid valve.

15. A hydraulic control apparatus for an automatic transmission according to claim 1, further comprising:
- a first line pressure supply fluid passage extending from said fluid pressure source;
- a second regulated pressure fluid passage extending from an output port of said pressure regulating valve;
- a third fluid passage serving as a drain passage;
- changeover means for switching between a first position providing communication between said fourth and first fluid passages and a second position providing communication between said fourth and third fluid passages;
- a fifth fluid passage for connecting said regulated fluid pressure passage to one of the first and second shift valves via said fluid pressure changeover valve;
- a sixth fluid passage for connecting said fourth fluid passage to supply the line pressure to the other one of said first and second shift valves via the fluid pressure changeover valve; and
- a seventh fluid passage provided with connecting means for connecting said regulated pressure passage with said sixth fluid passage when the fluid pressure in said regulated pressure passage is higher than the fluid pressure in said sixth fluid passage.

16. A hydraulic control apparatus for an automatic transmission according to claim 2, further comprising:
- a first line pressure supply fluid passage extending from said fluid pressure source;
- a second regulated pressure fluid passage extending from an output port of said pressure regulating valve;
- a third fluid passage serving as a drain passage;
- changeover means for switching between a first position providing communication between said fourth and first fluid passages and a second position providing communication between said fourth and third fluid passages;
- a fifth fluid passage for connecting said regulated fluid pressure passage to one of the first and second shift valves via said fluid pressure changeover valve;
- a sixth fluid passage for connecting said fourth fluid passage to supply the line pressure to the other one of said first and second shift valves via the fluid pressure changeover valve; and
- a seventh fluid passage provided with connecting means for connecting said regulated pressure passage with said sixth fluid passage when the fluid pressure in said regulated pressure passage is higher than the fluid pressure in said sixth fluid passage.

17. A hydraulic control apparatus for an automatic transmission according to claim 1 further comprising:
- a changeover valve for selectively supplying said first hydraulic servo with either fluid pressure from said first shift valve or fluid pressure supplied to said second hydraulic servo, said changeover valve supplying said first hydraulic servo with the fluid pressure supplied to the second hydraulic servo when the fluid pressure from said first shift valve becomes less than the fluid pressure supplied to said second hydraulic servo;
- a third friction engagement element located in said first shift mechanism and a third hydraulic servo for releasing said third friction engagement element to effect a shift from a first speed to a second speed while said first and second friction engagement elements are maintained in engagement; and
- wherein, in the shift from the first speed to the second speed, said second shift valve maintains said second friction engagement element in engagement by supplying fluid pressure to said second hydraulic servo and first shift valve switches to discontinue supply of the regulated fluid pressure to said third hydraulic servo and to change supply of fluid pressure to said first servo from the regulated fluid pressure to the line pressure.

18. A hydraulic control apparatus for an automatic transmission according to claim 2 further comprising:

a changeover valve for selectively supplying said first hydraulic servo with either fluid pressure from said first shift valve or fluid pressure supplied to said second hydraulic servo, said changeover valve supplying said first hydraulic servo with the fluid pressure supplied to the second hydraulic servo when the fluid pressure from said first shift valve becomes less than the fluid pressure supplied to said second hydraulic servo;

a third friction engagement element located in said first shift mechanism and a third hydraulic servo for releasing said third friction engagement element to effect a shift from a first speed to a second speed while said first and second friction engagement elements are maintained in engagement; and wherein, in the shift from the first speed to the second speed, said second shift valve maintains said second friction engagement element in engagement by supplying fluid pressure to said second hydraulic servo and first shift valve switches to discontinue supply of the regulated fluid pressure to said third hydraulic servo and to change supply of fluid pressure to said first servo from the regulated fluid pressure to the line pressure.

* * * * *

UNITED STATES PATENT AND TRADEMARK OFFICE
CERTIFICATE OF CORRECTION

PATENT NO. : 5,779,585
DATED : July 14, 1998
INVENTOR(S) : TSUKAMOTO et al

It is certified that error appears in the above-indentified patent and that said Letters Patent is hereby corrected as shown below:

On the title page, Under the heading "References Cited", "U.S. 5,634,864 Niyama" should read --U.S. 5,634,864 Niiyama--.

Col. 4, line 15, "24" should read --B4--.

Col. 6, line 39, "32" should read --B2--.

Col. 12, line 33, "$P_{BSC}^{2-3}$" should read --$P_{B5C}^{2-3}$--.

Col. 18, line 50, "24" should read --B4--;
line 52, "34" should read --B4--; and
line 59, "34" should read --B4--.

Col. 20, line 12, "a" should read --$\underline{a}$--.

Signed and Sealed this

Eleventh Day of May, 1999

Attest:

Q. TODD DICKINSON

*Attesting Officer*     *Acting Commissioner of Patents and Trademarks*